United States Patent
Park et al.

(10) Patent No.: US 10,314,019 B2
(45) Date of Patent: *Jun. 4, 2019

(54) METHOD FOR CONTROLLING UPLINK POWER IN WIRELESS COMMUNICATION SYSTEM AND DEVICE THEREFOR

(71) Applicant: LG ELECTRONICS INC., Seoul (KR)

(72) Inventors: Jonghyun Park, Seoul (KR); Hanbyul Seo, Seoul (KR); Seungmin Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 15/868,138

(22) Filed: Jan. 11, 2018

(65) Prior Publication Data

US 2018/0139751 A1 May 17, 2018

Related U.S. Application Data

(63) Continuation of application No. 14/760,127, filed as application No. PCT/KR2014/001769 on Mar. 4, 2014, now Pat. No. 9,907,058.

(Continued)

(51) Int. Cl.
*G08C 17/00* (2006.01)
*H04W 72/04* (2009.01)
(Continued)

(52) U.S. Cl.
CPC ....... *H04W 72/0413* (2013.01); *H04L 1/1812* (2013.01); *H04L 5/14* (2013.01);
(Continued)

(58) Field of Classification Search
None
See application file for complete search history.

(56) References Cited

U.S. PATENT DOCUMENTS

2003/0130002 A1 7/2003 Chen et al.
2007/0042799 A1 2/2007 Jubin et al.
(Continued)

FOREIGN PATENT DOCUMENTS

| CN | 102918793 A | 2/2013 |
|---|---|---|
| KR | 10-2011-0036489 A | 4/2011 |

(Continued)

OTHER PUBLICATIONS

3GPP TS 36.213.V11.0.0 (Year: 2012).*

(Continued)

*Primary Examiner* — Kwang B Yao
*Assistant Examiner* — Juvena W Loo
(74) *Attorney, Agent, or Firm* — Birch, Stewart, Kolasch & Birch, LLP

(57) ABSTRACT

A method for performing uplink power control by a user equipment, the method includes receiving downlink, DL, hybrid automatic repeat and request, HARQ configuration information indicating a uplink-downlink, UL-DL, configuration used as a DL HARQ reference configuration; receiving downlink control information, DCI, containing transmit power control, TPC, information; determining transmit power of a physical uplink control channel, PUCCH, carrying ACK/NACK information for a physical downlink shared channel, PDSCH, based on the TPC information; and transmitting the PUCCH with the transmit power of the PUCCH, wherein the transmit power of the PUCCH is determined based on the TPC information according to the DL HARQ reference configuration.

10 Claims, 9 Drawing Sheets

Related U.S. Application Data

(60) Provisional application No. 61/930,948, filed on Jan. 24, 2014, provisional application No. 61/930,469, filed on Jan. 22, 2014, provisional application No. 61/772,498, filed on Mar. 4, 2013.

(51) Int. Cl.

| | | |
|---|---|---|
| *H04L 1/18* | (2006.01) | |
| *H04L 5/14* | (2006.01) | |
| *H04W 52/14* | (2009.01) | |
| *H04W 52/22* | (2009.01) | |
| *H04W 52/06* | (2009.01) | |
| *H04W 88/08* | (2009.01) | |
| *H04W 72/12* | (2009.01) | |
| *H04W 52/38* | (2009.01) | |
| *H04W 52/54* | (2009.01) | |

(52) U.S. Cl.
CPC ......... *H04W 52/06* (2013.01); *H04W 52/146* (2013.01); *H04W 52/228* (2013.01); *H04W 72/042* (2013.01); *H04W 52/38* (2013.01); *H04W 52/54* (2013.01); *H04W 72/0473* (2013.01); *H04W 72/1289* (2013.01); *H04W 88/08* (2013.01)

(56) References Cited

U.S. PATENT DOCUMENTS

| | | |
|---|---|---|
| 2009/0042593 A1 | 2/2009 | Yavuz et al. |
| 2009/0117931 A1 | 5/2009 | Shin et al. |
| 2010/0227638 A1 | 9/2010 | Park et al. |
| 2010/0331037 A1 | 12/2010 | Jen |
| 2011/0141928 A1 | 6/2011 | Shin et al. |
| 2011/0149813 A1 | 6/2011 | Parkvall et al. |
| 2011/0235582 A1 | 9/2011 | Chen et al. |
| 2012/0155337 A1* | 6/2012 | Park ................... H04L 1/1692 370/280 |
| 2012/0176915 A1 | 7/2012 | Lee et al. |
| 2012/0202554 A1 | 8/2012 | Seo et al. |
| 2012/0275403 A1 | 11/2012 | Zhang et al. |
| 2013/0039286 A1 | 2/2013 | Larsson et al. |
| 2013/0114505 A1 | 5/2013 | Haim et al. |
| 2013/0114562 A1 | 5/2013 | Seo et al. |
| 2013/0143614 A1 | 6/2013 | Lee et al. |
| 2013/0194980 A1* | 8/2013 | Yin ..................... H04L 1/1607 370/280 |
| 2014/0071903 A1 | 3/2014 | Sorrentino et al. |
| 2014/0092824 A1 | 4/2014 | He et al. |
| 2014/0161003 A1 | 6/2014 | Han et al. |
| 2014/0198733 A1 | 7/2014 | Yin et al. |
| 2015/0055502 A1 | 2/2015 | Seo et al. |
| 2015/0341866 A1 | 11/2015 | Park et al. |
| 2015/0358914 A1 | 12/2015 | Song et al. |
| 2015/0358916 A1 | 12/2015 | Park et al. |
| 2016/0029323 A1 | 1/2016 | Hwang et al. |

FOREIGN PATENT DOCUMENTS

| | | |
|---|---|---|
| KR | 10-2013-0001731 A | 1/2012 |
| KR | 10-2012-0017005 A | 2/2012 |
| KR | 10-2012-0048707 A | 5/2012 |
| KR | 10-2012-0070345 A | 6/2012 |
| KR | 10-2012-0080327 A | 7/2012 |
| KR | 10-2012-0100759 A | 9/2012 |
| KR | 10-2012-0112369 A | 10/2012 |
| KR | 10-2013-0018052 A | 2/2013 |
| KR | 10-2013-0018220 A | 2/2013 |
| WO | WO 2010/091425 A2 | 8/2010 |
| WO | WO 2012/008773 A2 | 1/2012 |
| WO | WO 2013/004007 A1 | 1/2013 |
| WO | WO 2013/014332 A1 | 1/2013 |
| WO | WO 2013/025562 A2 | 2/2013 |

OTHER PUBLICATIONS

ETSI, "LTE; Evolved Universal Terrestrial Radio Access (E-UTRA); Physical layer procedures (3GPP TS 36.213 version 11.1.0 Release 11)", ETSI TS 136 213 V11.1.0, Feb. 2013, pp. 1-161.

Huawei et al., "General Considerations on Uplink MIMO," 3GPP TSG-RAN WG1 Meeting #68, R1-120694, Dresden, Germany, Feb. 6-10, 2012 (Downloaded by EPO on Jan. 31, 2012), pp. 1-4.

Qualcomm Incorporated, "eICIC CSI Feedback Requirements," 3GPP TSG-RAN WG4 2010 AH#4, R4-103791, Xi'an, China, Oct. 11-15, 2010 (Downloaded by EPO on Oct. 7, 2010), pp. 1-2.

CATT, "TDD Inter-band Carrier Aggregation", 3GPP TSG RAN WG1 Meeting #66, R1-112106, Athens, Greece, Aug. 22-26, 2011, 5 pages.

Motorola Mobility, "Finalisation for Introducing Rel-11 Features", 3GPP TSG-RAN WG1 Meeting #71, R1-125404, New Orleans, USA, Nov. 12-16, 2012, pp. 1-152 (153 pages total).

\* cited by examiner

PDSCH-ACK/NACK timing (UL-DL configuration #1)

HARQ processes in UL-DL configuration #1

METHOD FOR CONTROLLING UPLINK POWER IN WIRELESS COMMUNICATION SYSTEM AND DEVICE THEREFOR

CROSS-REFERENCE TO RELATED APPLICATIONS

This Application is a Continuation of U.S. patent application Ser. No. 14/760,127 filed on Jul. 9, 2015 ( now U.S. Pat. No. 9,907,058 issued on Feb. 27, 2018), which is the National Phase of PCT International Application No. PCT/KR2014/001769 filed on Mar. 4, 2014, which claims the benefit under 35 U.S.C. § 119(e) to U.S. Provisional Application Nos. 61/930,948 filed on Jan. 24, 2014, 61/930,469 filed on Jan. 22, 2014 and 61/772,498 filed on Mar. 4, 2013, all of which are hereby expressly incorporated by reference into the present application.

BACKGROUND OF THE INVENTION

Field of the Invention

The present invention relates to a wireless communication system and, more particularly, to a method for controlling uplink power and a device therefor.

Discussion of the Related Art

A structure of an LTE system which is an example of a wireless communication system to which the present invention may be applied will be described with reference to FIG. 1.

FIG. 1 illustrates a schematic network structure of an evolved universal mobile telecommunication system (E-UMTS). An E-UMTS system is an evolved version of the UMTS system and basic standardization thereof is in progress under the 3rd Generation Partnership Project (3GPP). The E-UMTS is also referred to as a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS includes a User Equipment (UE), base stations (or eNBs or eNode Bs), and an Access Gateway (AG) which is located at an end of a network (E-UTRAN) and which is connected to an external network. Generally, an eNB can simultaneously transmit multiple data streams for a broadcast service, a multicast service and/or a unicast service.

One or more cells may exist for one BS. The cell provides a downlink or uplink transmission service to several UEs using any one of bandwidths of 1.25, 2.5, 5, 10, 15 and 20 MHz. Different cells may be set to provide different bandwidths. A BS controls data transmission or reception to or from a plurality of UEs. The BS transmits downlink scheduling information to a UE with respect to downlink (DL) data so as to inform the UE of time/frequency domain, coding, data size, Hybrid Automatic Repeat and reQuest (HARQ) associated information of data to be transmitted, or the like. The BS transmits uplink scheduling information to a UE with respect to uplink (UL) data so as to inform the UE of time/frequency domain, coding, data size, HARQ associated information used by the UE, or the like. An interface for transmitting user traffic or control traffic can be used between BSs. A Core Network (CN) may include the AG, a network node for user registration of the UE, or the like. The AG manages mobility of a UE on a Tracking Area (TA) basis. One TA includes a plurality of cells.

Wireless communication technology has been developed to reach the LTE based on Wideband Code Division Multiple Access (WCDMA), but demands and expectations of users and providers have continuously increased. In addition, since other aspects of wireless access technology continue to evolve, new advances are required to remain competitive in the future. There is a need for reduction in cost per bit, service availability increase, the use of a flexible frequency band, a simple structure and an open type interface, appropriate power consumption of a UE, etc.

Recently, 3GPP has been proceeding with standardization of a successor to LTE. In this specification, the successor will be referred to as "LTE-A". LTE-A is designed to support a wideband covering a maximum frequency of 100 MHz. To this end, a carrier aggregation (CA) technique is employed to achieve wideband using a plurality of frequency blocks. CA uses a plurality of frequency blocks as one large logical frequency band in order to use a wider frequency band. The bandwidth of a frequency block may be defined based on the bandwidth of the system block used in the LTE system. Each frequency block may be referred to as a component carrier (CC) or a cell.

In addition, in the LTE system, a duplex operation of dividing all available resources into DL resources (i.e., resources which a base station uses to transmit a signal to a UE) and UL resources (i.e., resources which the UE uses to transmit a signal to the base station) may be supported. For example, a frequency division duplex (FDD) scheme or a time division duplex (TDD) scheme may be applied. In this way, each resource may be used either for DL or for UL. In the legacy LTE system, use of each resource is specified through system information.

Recently, a method to dynamically designate a DL-UL configuration in performing a duplex operation is under discussion as an improved method for the LTE/LTE-A systems.

SUMMARY OF THE INVENTION

An object of the present invention devised to solve the problem lies in an improved uplink power control method that efficiently supports DL-UL interference management and traffic adaptation in dynamically establishing a DL-UL configuration.

It will be appreciated by persons skilled in the art that the objects that could be achieved with the present invention are not limited to what has been particularly described hereinabove and the above and other objects that the present invention could achieve will be more clearly understood from the following detailed description.

The object of the present invention can be achieved by providing a method for performing uplink transmit power control by a user equipment in a wireless communication system, the method including receiving configuration information about a plurality of subframe sets from a base station, receiving uplink grant information for scheduling uplink transmission in a plurality of subframes and transmit power control (TPC) information, and performing transmission of an uplink channel in the plurality of subframes. When the plurality of subframes belongs to one of the subframe sets, the TPC information may be applied to only one of the subframes.

In another aspect of the present invention, provided herein is a method for receiving an uplink signal by a base station in a wireless communication system, the method including transmitting configuration information about a plurality of subframe sets to a user equipment, transmitting uplink grant information for scheduling uplink transmission in a plurality of subframes and transmit power control (TPC) information to the user equipment, and receiving the uplink signal from the user equipment on an uplink channel in the plurality of subframes. When the plurality of subframes belongs to one of the subframe sets, the TPC information may be applied to only one of the subframes.

In another aspect of the present invention, provided herein is a user equipment for performing uplink transmit power control in a wireless communication system, including a transmission module, a reception module, and a processor. The processor may be configured to control the reception module to receive configuration information about a plurality of subframe sets from a base station, control the reception module to receive uplink grant information for scheduling uplink transmission in a plurality of subframes and transmit power control (TPC) information, and control the transmission module to perform transmission of an uplink channel in the plurality of subframes. When the plurality of subframes belongs to one of the subframe sets, the TPC information may be applied to only one of the subframes.

In another aspect of the present invention, provided herein is a base station for receiving an uplink signal in a wireless communication system, including a transmission module, a reception module, and a processor. The processor may be configured to control the transmission module to transmit configuration information about a plurality of subframe sets to a user equipment, control the transmission module to transmit uplink grant information for scheduling uplink transmission in a plurality of subframes and transmit power control (TPC) information to the user equipment, and control the reception module to receive the uplink signal from the user equipment on an uplink channel in the plurality of subframes. When the plurality of subframes belongs to one of the subframe sets, the TPC information may be applied to only one of the subframes.

Embodiments according to the aspects of the present invention may include the following details.

The uplink channel may be transmitted with the same transmit power in the subframes.

The TPC information may be applied to only one subframe of the subframes, the only one subframe preceding the other subframes in time.

The subframes may be consecutive.

When the subframes belong to different subframe sets of the plurality of subframe sets, the TPC information may be applied to each of the subframes.

The uplink grant information and the TPC information may be contained in downlink control information (DCI) format 0 or DCI format 4, wherein an uplink (UL) index field may be contained in the DCI format 0 or DCI format 4 is set to 11.

The information about a predetermined UL-DL configuration may be provided for the user equipment.

The information about the predetermined UL-DL configuration may be provided through a system information block or dynamic signaling.

The predetermined UL-DL configuration may be a UL-DL configuration #0.

The uplink grant information and the TPC information may be received in a subframe #1, wherein the subframes may be subframes #7 and #8.

The uplink channel may be a physical uplink shared channel (PUSCH).

The wireless communication system may be a time division duplex (TDD) system.

It is to be understood that both the foregoing general description and the following detailed description of the present invention are exemplary and explanatory and are intended to provide further explanation of the invention as claimed.

According to an embodiment of the present invention, an improved power control method for efficiently supporting DL-UL interference management and traffic adaptation in dynamically establishing DL-UL configuration may be provided.

The effects that can be obtained from the present invention are not limited to the aforementioned effects, and other effects may be clearly understood by those skilled in the art from the descriptions given below.

BRIEF DESCRIPTION OF THE DRAWINGS

The accompanying drawings, which are included to provide a further understanding of the invention, illustrate embodiments of the invention and together with the description serve to explain the principle of the invention.

DETAILED DESCRIPTION OF THE EMBODIMENTS

Figure 1:
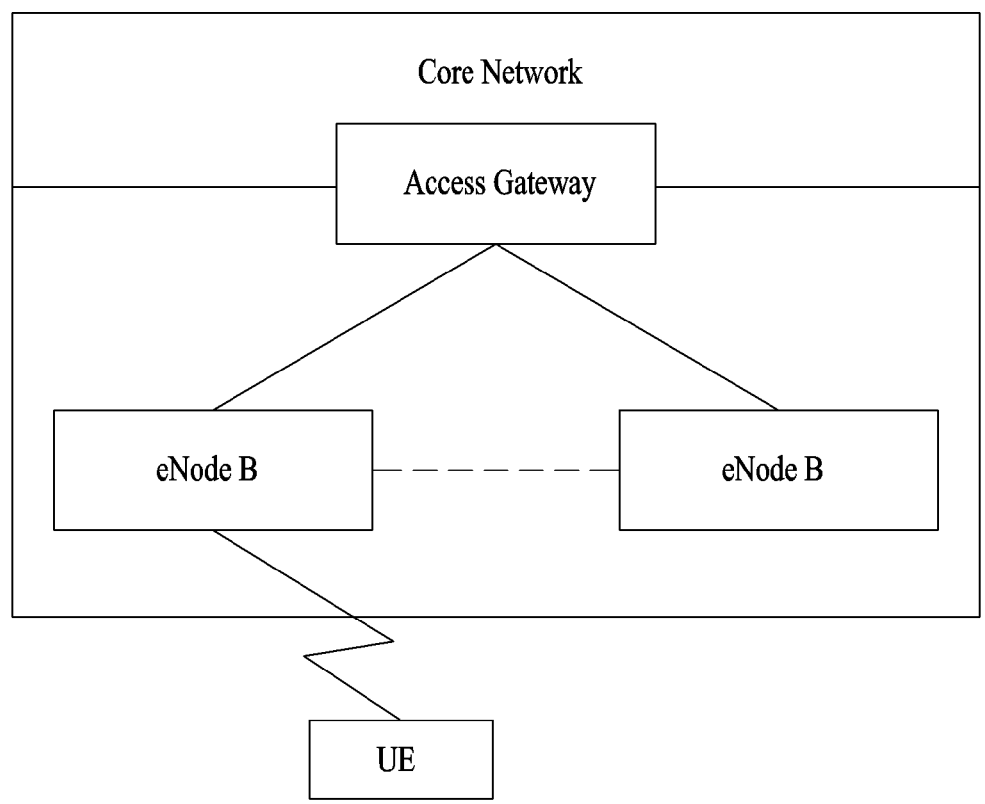
FIG. 1 is a schematic diagram showing a network architecture of an Evolved Universal Mobile Telecommunications System (E-UMTS) as an example of a mobile communication system.

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

In this specification, the embodiments of the present invention have been described based on the data transmission and reception between a base station BS and a user equipment UE. In this case, the base station BS means a terminal node of a network, which performs direct communication with the user equipment UE. A specific operation which has been described as being performed by the base station may be performed by an upper node of the base station BS as the case may be.

In other words, it will be apparent that various operations performed for communication with the user equipment UE in the network which includes a plurality of network nodes along with the base station may be performed by the base station BS or network nodes other than the base station BS. At this time, the base station BS may be replaced with terms such as a fixed station, Node B, eNode B (eNB), and an access point (AP). A relay node may be replaced with terms such as a relay node (RN) and a relay station (RS). Also, a terminal may be replaced with terms such as a user equipment (UE), a mobile station (MS), a mobile subscriber station (MSS), and a subscriber station (SS).

Specific terminologies hereinafter used in the embodiments of the present invention are provided to assist understanding of the present invention, and various modifications may be made in the specific terminologies within the range that they do not depart from technical spirits of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention may be supported by standard documents disclosed in at least one of wireless access systems, i.e., IEEE 802 system, 3GPP system, 3GPP LTE system, 3GPP LTE, 3GPP LTE-A (LTE-Advanced) system, and 3GPP2 system. Namely, among the embodiments of the present invention, apparent steps or parts, which are not described to clarify technical spirits of the present invention, may be supported by the above documents. Also, all terminologies disclosed herein may be described by the above standard documents.

The following technology may be used for various wireless access systems such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as universal terrestrial radio access (UTRA) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) communication system is a part of an evolved UMTS (E-UMTS) that uses E-UTRA, and uses OFDMA in a downlink while uses SC-FDMA in an uplink. LTE-advanced (LTE-A) is an evolved version of the 3GPP LTE system. WiMAX may be described by the IEEE 802.16e standard (WirelessMAN-OFDMA Reference System) and the advanced IEEE 802.16m standard (WirelessMAN-OFDMA Advanced system). Although the following description will be based on the 3GPP LTE system and the 3GPP LTE-A system to clarify description, it is to be understood that technical spirits of the present invention are not limited to the 3GPP LTE and the 3GPP LTE-A system.

Figure 2:
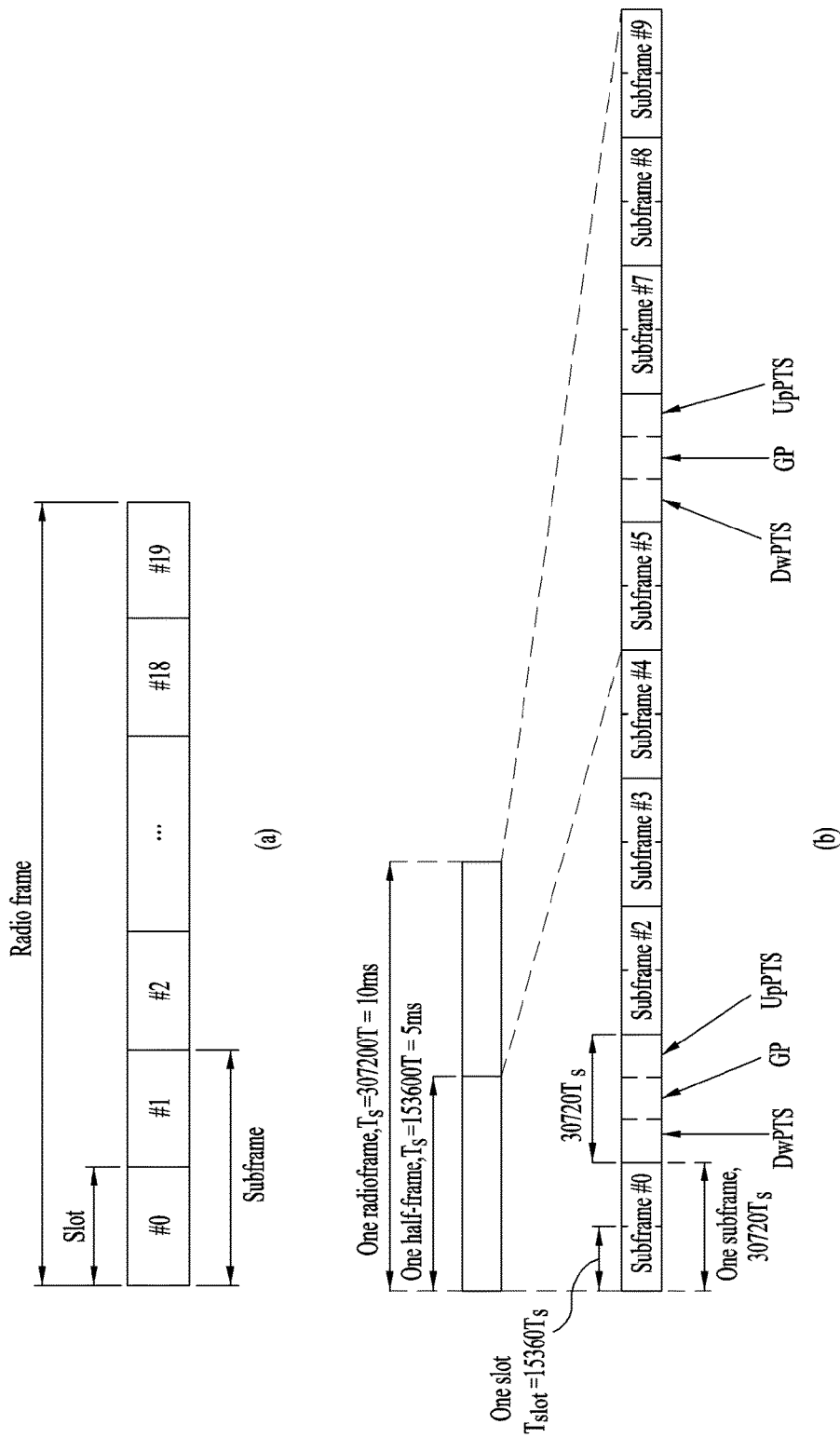
FIG. 2 exemplarily shows a radio frame structure.

A radio frame structure will now be described with reference to FIG. 2.

In a cellular OFDM wireless packet communication system, an uplink/downlink data packet is transmitted on a eme basis and one subframe is defined as a predetermined time interval including a plurality of OFDM symbols. 3GPP LTE standard supports a type-1 radio frame structure applicable to frequency division duplex (FDD) and a type-2 radio frame structure applicable to time division duplex (TDD).

FIG. 2(a) illustrates the type-1 radio frame structure. A downlink radio frame is divided into 10 subframes. Each subframe is further divided into two slots in the time domain. A unit time during which one subframe is transmitted is defined as transmission time interval (TTI). For example, one subframe may be 1 ms in duration and one slot may be 0.5 ms in duration. A slot may include a plurality of orthogonal frequency division multiplexing (OFDM) symbols in the time domain and includes a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. A Resource Block (RB) is a resource allocation unit including a plurality of contiguous subcarriers in a slot.

The number of OFDM symbols included in one slot depends on cyclic prefix (CP) configuration. CP is divided into an extended CP and a normal CP. For example, when OFDM symbols are configured according to normal CP, the number of OFDM symbols included in one slot may be 7. When the OFDM symbols are configured according to extended CP, the duration of one OFDM symbol increases and thus the number of OFDM symbols included in one slot is smaller than the number of OFDM symbols included in one slot when the OFDM symbols are configured using the normal CP. In the extended CP case, the number of OFDM symbols included in one slot may be 6, for example. When a channel status is unstable, for example, when a UE moves at a high speed, the extended CP can be used to reduce inter-symbol interference.

When the normal CP is used, one slot includes 7 OFDM symbols, and thus one subframe includes 14 OFDM symbols. In this case, up to three OFDM symbols at the start of each subframe can be allocated to a physical downlink control channel (PDCCH) and the other three OFDM symbols can be allocated to a physical downlink shared channel (PDSCH).

FIG. 2(b) illustrates the type-2 radio frame structure. The type-2 radio frame includes two half frames each having 5 subframes, a downlink pilot time slot (DwPTS), a guard period (GP), and an uplink pilot time slot (UpPTS). Each subframe includes two slots. The DwPTS is used for initial cell search, synchronization, or channel estimation in a UE, whereas the UpPTS is used for channel estimation in an eNB and uplink transmission synchronization in a UE. The GP is a period between a downlink and an uplink, for eliminating interference with the uplink caused by multi-path delay of a downlink signal. A subframe is composed of two slots irrespective of radio frame type.

The radio frame can be configured differently according to duplex mode. Downlink transmission is discriminated from uplink transmission by frequency in FDD (Frequency Division Duplex) mode, and thus the radio frame includes only one of a downlink subframe and an uplink subframe in a specific frequency band.

Table 1 shows UL-DL configurations of subframes in a radio frame in the TDD mode.

TABLE 1

| Uplink-downlink Config-uration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe config. | DwPTS | Normal cyclic prefix in uplink | Extended cyclic prefix in uplink | DwPTS ee | Normal cyclic prefix in uplink | Extended cyclic prefix in uplink |
| 0 | 6592 · Ts | 2192 · Ts | 2560 · Ts | 7680 · Ts | 2192 · Ts | 2560 · Ts |
| 1 | 19760 · Ts | | | 20480 · Ts | | |
| 2 | 21952 · Ts | | | 23040 · Ts | | |
| 3 | 24144 · Ts | | | 25600 · Ts | | |
| 4 | 26336 · Ts | | | 7680 · Ts | 4384 · Ts | 5120 · Ts |
| 5 | 6592 · Ts | 4384 · Ts | 5120 · Ts | 20480 · Ts | | |
| 6 | 19760 · Ts | | | 23040 · Ts | | |
| 7 | 21952 · Ts | | | — | — | — |
| 8 | 24144 · Ts | | | — | — | — |

The aforementioned radio frame structure is purely exemplary and thus the number of subframes included in a radio frame, the number of slots included in a subframe, or the number of symbols included in a slot may vary.

Figure 3:
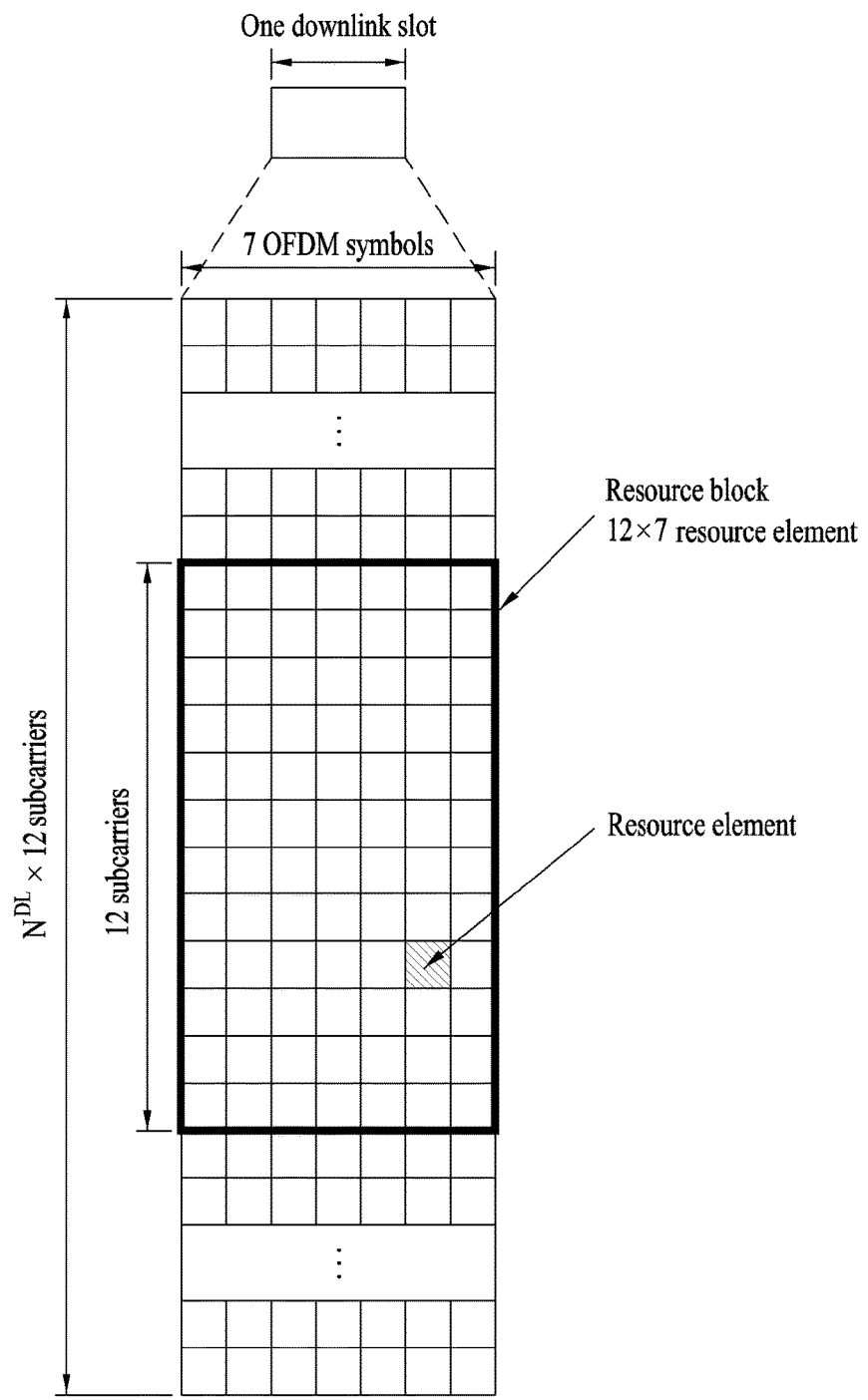
FIG. 3 exemplarily shows a resource grid of a downlink slot.

FIG. 3 illustrates a resource grid for a downlink slot.

A downlink slot includes 7 OFDM symbols in the time domain and an RB includes 12 subcarriers in the frequency domain, which does not limit the scope and spirit of the present invention. For example, a slot includes 7 OFDM symbols in the case of normal CP, whereas a slot includes 6 OFDM symbols in the case of extended CP. Each element of the resource grid is referred to as a resource element (RE). An RB includes 12×7 REs. The number of RBs in a downlink slot, NDL depends on a downlink transmission bandwidth. An uplink slot may have the same structure as a downlink slot.

Figure 4:
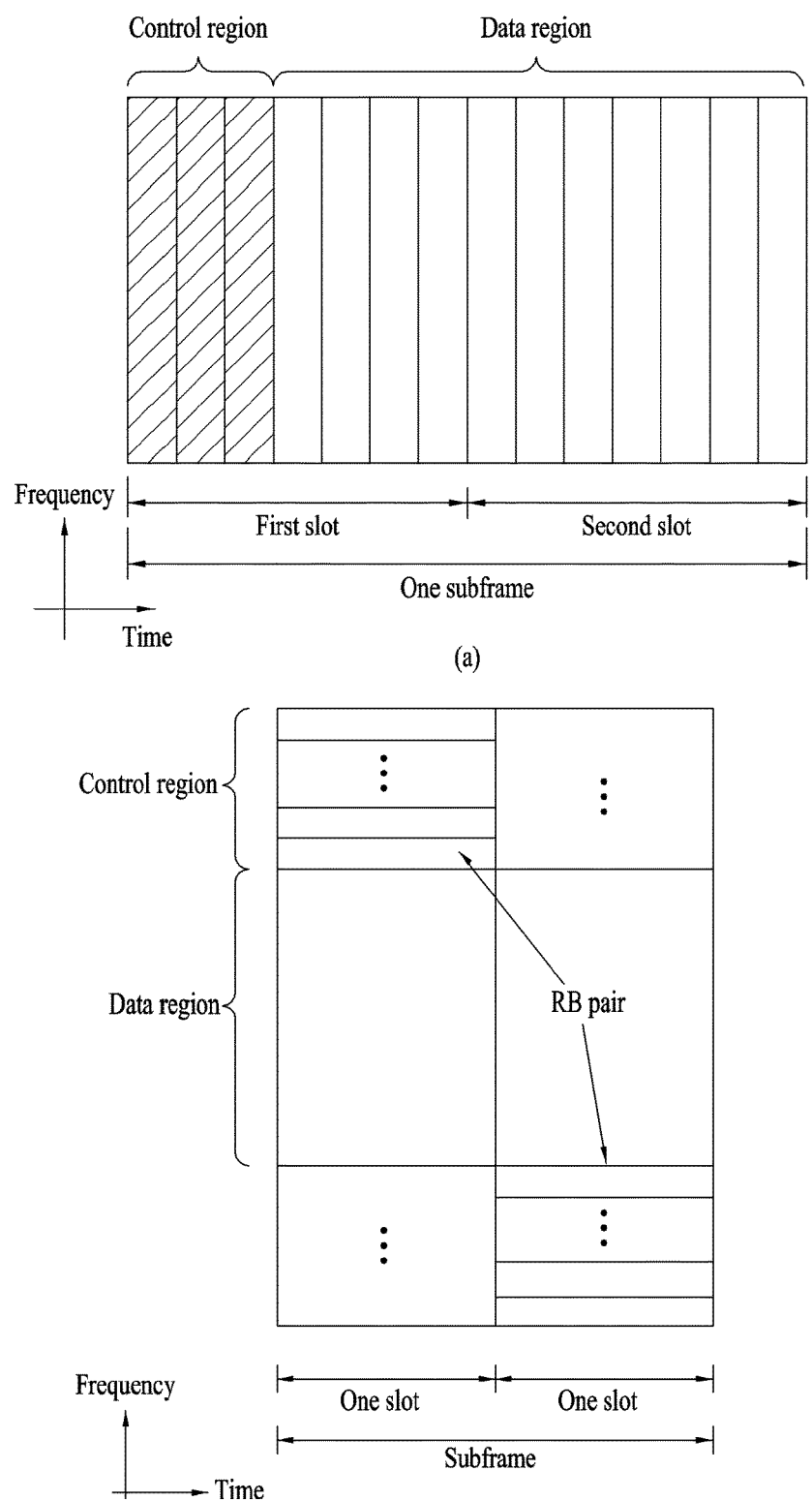
FIG. 4 exemplarily shows a downlink subframe structure and an uplink subframe structure.

FIG. 4(a) illustrates a downlink subframe structure.

Up to three OFDM symbols at the start of the first slot in a downlink subframe are used for a control region to which control channels are allocated and the other OFDM symbols of the downlink subframe are used for a data region to which a PDSCH is allocated.

Downlink control channels used in 3GPP LTE include a physical control format indicator channel (PCFICH), a physical downlink control channel (PDCCH), and a physical hybrid automatic repeat request (ARQ) indicator channel (PHICH). The PCFICH is located in the first OFDM symbol of a subframe, carrying information about the number of OFDM symbols used for transmission of control channels in the subframe. The PHICH delivers a HARQ acknowledgment/negative acknowledgment (ACK/NACK) signal in response to an uplink transmission.

Control information carried on the PDCCH is called downlink control information (DCI). The DCI includes uplink resource allocation information, downlink resource allocation information or an uplink transmit (Tx) power control command for an arbitrary UE group. The PDCCH delivers information about resource allocation and a transport format for a Downlink Shared Channel (DL-SCH), resource allocation information about an Uplink Shared Channel (UL-SCH), paging information of a Paging Channel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs.

Information content of DCI formats are as follows.

DCI format 0: Signaling of resource allocation information for physical uplink shared channel (PUSCH) transmission.

DCI format 1: Signaling of resource allocation information for single codeword physical downlink shared channel (PDSCH) transmission.

DCI format 1A: Compact signaling of resource allocation information for single codeword PDSCH transmission.

DCI format 1B: Compact signaling of resource allocation information for PDSCH transmission using rank-1 closed loop precoding.

DCI format 1C: Very compact signaling of resource allocation information for PDSCH transmission (for, for example, paging or broadcasting of system information.

DCI format 1D: Compact signaling of resource allocation information for PDSCH transmission using multi-user MIMO (Multiple Input Multiple Output).

DCI format 2: Signaling of PDSCH resource allocation information for a closed loop MIMO operation.

DCI format 2A: Signaling of PDSCH resource allocation information for an open loop MIMO operation.

DCI format 2B: Signaling of resource allocation information for dual layer transmission using a demodulation reference signal (DMRS).

DCI format 2C: Signaling of resource allocation information for closed loop spatial multiplexing transmission using a DMRS.

DCI format 2D: Signaling of resource allocation information for supporting a Coordinated Multipoint (CoMP) operation.

DCI format 3/3A: Signaling for a PUCCH/PUSCH power control command containing 2-bit or 1-bit power adjustment information.

DCI format 4: Signaling for uplink scheduling for one uplink cell supporting the multi-antenna port transmission mode.

A PDCCH is formed by aggregation of one or more consecutive Control Channel Elements (CCEs). A CCE is a logical allocation unit used to provide a PDCCH at a coding rate based on the state of a radio channel. A CCE corresponds to a plurality of REs. The format of a PDCCH and the number of available bits for the PDCCH are determined according to the correlation between the number of CCEs and a coding rate provided by the CCEs.

An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH carries a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

FIG. 4(b) illustrates an uplink subframe structure.

An uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain single carrier property, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Hybrid Automatic Repeat Request (HARQ) Operation

As a control method for reception failure of data, the following HARQ operation may be applied. If a data transmitter receives an ACK signal from a data receiver after transmitting a packet, the data transmitter may transmit a new packet. If the data transmitter receives a NACK signal, the previously transmitted packet may be retransmitted. In this case, a packet to which encoding is applied according to the function of forward error correction (FEC) may be retransmitted. Accordingly, the data receiver receives the packet. If the data receiver succeeds in decoding the received packet, it transmits an ACK signal. If the data receiver fails to decode the packet, it transmits a NACK signal and stores the received packet in the buffer. Then, if the data receiver receives a retransmitted packet according to the NACK signal, it decodes the same in combination with the received packet in the buffer. Thereby, the success rate of packet reception may be increased.

The HARQ scheme may be divided into a synchronous HARQ scheme and an asynchronous HARQ scheme according to retransmission timing. In the synchronous HARQ scheme, when initial transmission fails, subsequent retransmission is performed at times determined by the system. For example, when retransmission is set to be performed every fourth time unit (e.g., subframe) after initial transmission fails, information about the retransmission time does not need to be additionally announced to the receiver. Accordingly, if the data transmitter receives a NACK signal, it retransmits the packet every fourth time until it receives an ACK signal. Meanwhile, in the asynchronous HARQ scheme, information about the retransmission time is separately scheduled. Accordingly, the retransmission time of the packet corresponding to the NACK signal may change depending on various conditions such as channel state.

The HARQ scheme may also be divided into an adaptive HARQ scheme and a non-adaptive HARQ scheme according to whether or not the amount of resources used in performing retransmission is determined in consideration of the channel state. In the non-adaptive HARQ scheme, the MCS level of a retransmitted packet, the number of resource blocks to be used and the like are maintained as determined in the initial transmission. For example, if the transmitter uses 8 RBs to transmit data in implementing initial transmission, it performs retransmission thereafter using 8 RBs. In the adaptive HARQ scheme, the demodulation scheme for a packet, the number of RBs to be used and the like depend on the channel sate. For example, even if initial transmission is performed using 8 RBs, subsequent retransmission may be performed using more than or less than 8 RBs depending on the channel state.

As described above, in performing data packet transmission through HARQ, the transmitter may transform a data packet into sub-packets of a predetermined size and perform initial transmission and retransmission in units of sub-packet. The receiver may attempt to decode the data packet by combining multiple sub-packets.

Multiple sub-packets used for initial transmission and retransmission by the HARQ scheme are generated from one codeword packet. The generated sub-packets may be distinguished from each other by the lengths of the sub-packets and the start positions of the sub-packets. Such distinguishable sub-packets are called a redundancy version (RV). The receiver may receive different RVs and attempt to decode a whole codeword by combining the RVs. For example, the HARQ operation may be performed in a manner that decoding is attempted by receiving sub-packets corresponding to a difference between a whole codeword packet to be received and the previously received sub-packets. This operation may be called a HARQ operation of an incremental redundancy (IR) scheme.

TDD HARQ

A description will be given of TDD signal transmission timing in a single carrier (or cell) situation with reference to FIGS. 5 to 11.

Figure 5:
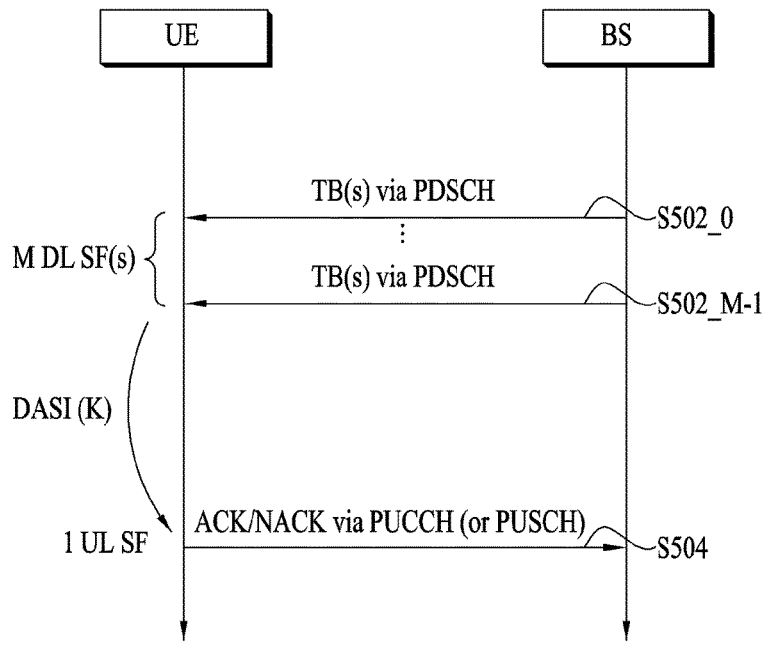
FIGS. 5 and 6 illustrate TDD UL ACK/NACK (Uplink Acknowledgement/Negative Acknowledgement) transmission timing in a single cell case.
Figure 6:
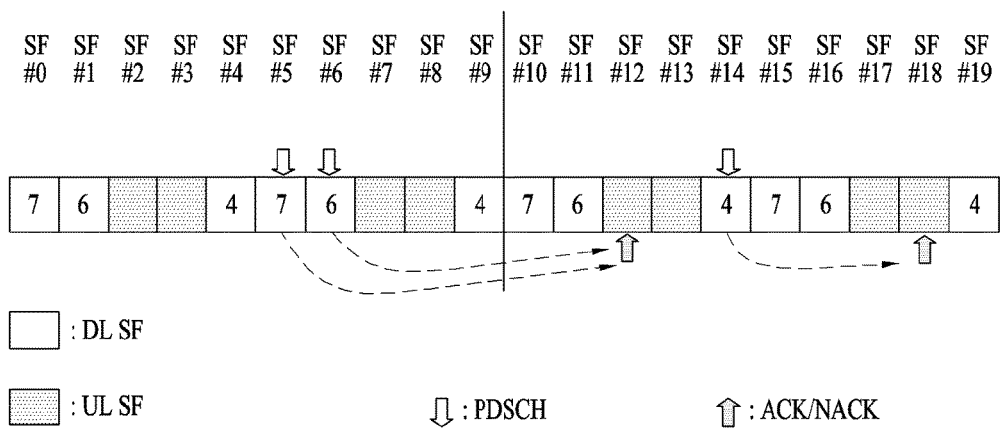

FIGS. 5 and 6 illustrate PDSCH-UL ACK/NACK timing. Here, UL ACK/NACK means ACK/NACK transmitted on uplink, as a response to DL data (e.g. PDSCH).

Referring to FIG. 5, a UE can receive one or more PDSCH signals in M DL subframes (SFs) (S502_0 to S502_M−1). Each PDSCH signal is used to transmit one or more (e.g. 2) transport blocks (TBs) according to transmission mode. A PDCCH signal indicating SPS (Semi-Persistent Scheduling) may also be received in step S502_0 to S502_M−1, which is not shown. When a PDSCH signal and/or an SPS release PDCCH signal is present in the M DL subframes, the UE transmits ACK/NACK through a UL subframe corresponding to the M DL subframes via processes for transmitting ACK/NACK (e.g. ACK/NACK (payload) generation, ACK/NACK resource allocation, etc.) (S504). ACK/NACK includes acknowledgement information about the PDSCH signal and/or an SPS release PDCCH received in step S502_0 to S502_M−1. While ACK/NACK is transmitted through a PUCCH basically, ACK/NACK is transmitted through a PUSCH when a PUSCH is transmitted at ACK/NACK transmission time. Various PUCCH formats shown in Table 3 can be used for ACK/NACK transmission. To reduce the number of ACK/NACK bits transmitted through a PUCCH format, various methods such as ACK/NACK bundling and ACK/NACK channel selection can be used.

As described above, in TDD, ACK/NACK relating to data received in the M DL subframes is transmitted through one UL subframe (i.e. M DL SF(s): 1 UL SF) and the relationship therebetween is determined by a DASI (Downlink Association Set Index).

Table 3 shows DASI (K: {k0, k1, . . . , k−1}) defined in LTE(-A). Table 3 shows spacing between a UL subframe transmitting ACK/NACK and a DL subframe relating to the UL subframe. Specifically, when a PDCCH that indicates PDSCH transmission and/or SPS release is present in a subframe n−k (k∈K), the UE transmits ACK/NACK in a subframe n.

TABLE 3

| TDD UL-DL Config-uration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

FIG. 6 illustrates UL ACK/NACK transmission timing when UL-DL configuration #1 is configured. In the figure, SF#0 to #9 and SF#10 to #19 respectively correspond to radio frames, and numerals in blocks denote UL subframes relating to DL subframes. For example, ACK/NACK for a PDSCH of SF#5 is transmitted in SF#5+7 (=SF#12) and ACK/NACK for a PDSCH of SF#6 is transmitted in SF#6+6 (=SF#12). Accordingly, both ACKs/NACKs for DL signals of SF#5/#6 are transmitted in SF#12. Similarly, ACK/NACK for a PDSCH of SF#14 is transmitted in SF#14+4 (=SF#18).

Figure 7:
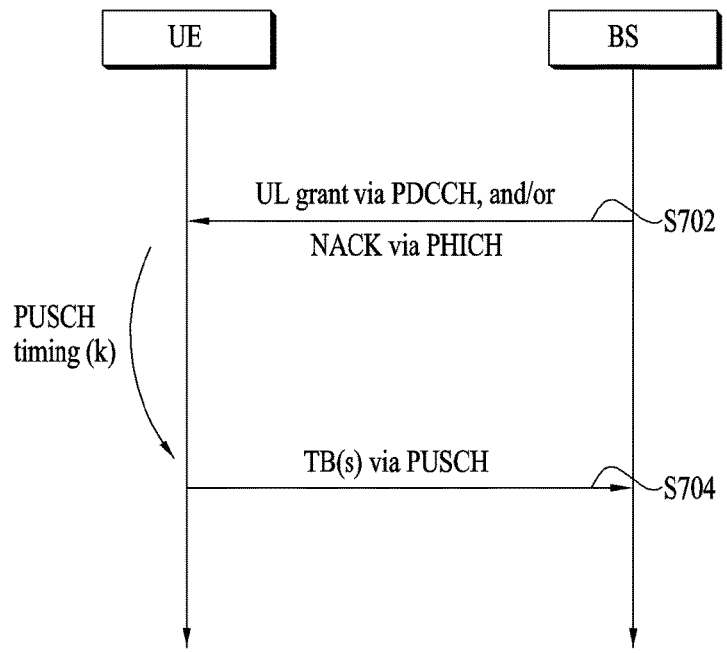
FIGS. 7 and 8 illustrate TDD PUSCH (Physical Uplink Shared Channel) transmission timing in a single cell case.
Figure 8:
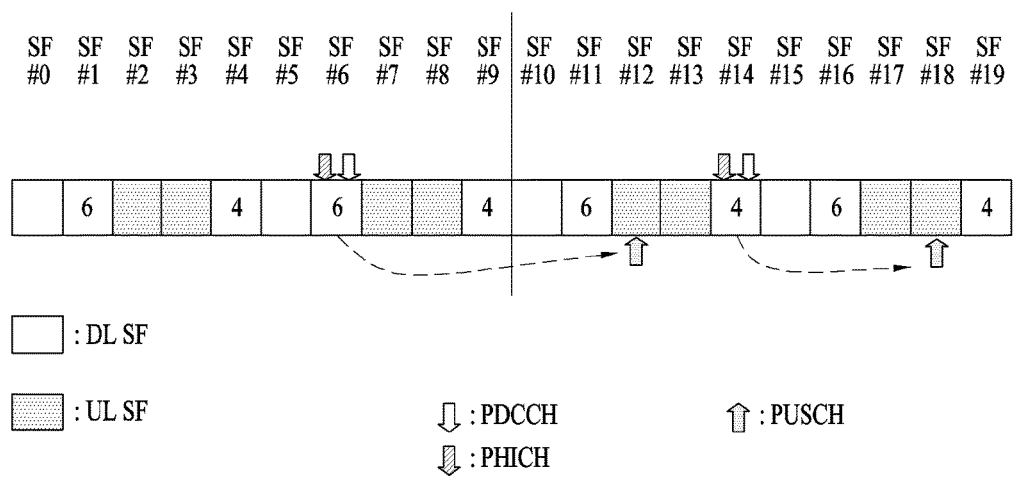

FIGS. 7 and 8 illustrate PHICH grant-PUSCH timing. A PUSCH can be transmitted corresponding to a PDCCH (UL grant) and/or a PHICH (NACK).

Referring to FIG. 7, the UE can receive a PDCCH (UL grant) and/or a PHICH (NACK) through a PDCCH (S702). Here, NACK corresponds to an ACK/NACK response to previous PUSCH transmission. In this case, the UE can initially transmit/retransmit one or more TBs through a PUSCH after k subframes via processes for PUSCH transmission (e.g. TB coding, TB-CW swiping, PUSCH resource allocation, etc.) (S704). The present embodiment is based on the assumption that a normal HARQ operation in which a PUSCH is transmitted once is performed. In this case, a PHICH and a UL grant corresponding to PUSCH transmission are present in the same subframe. However, in case of subframe bundling in which a PUSCH is transmitted multiple times through a plurality of subframes, a PHICH and a UL grant corresponding to PUSCH transmission may be present in different subframes.

Table 4 shows a UAI (Unlink Association Index) (k) for PUSCH transmission in LTE(-A). Table 4 shows spacing between a DL subframe from which a PHICH/UL grant is detected and a UL subframe relating to the DL subframe. Specifically, when a PHICH/UL grant is detected from a subframe n, the UE can transmit a PUSCH in a subframe n+k.

TABLE 4

| TDD UL-DL Config-uration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | 4 | 6 | | | | |
| 1 | | 6 | | | 4 | | 6 | | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

FIG. 8 illustrates PUSCH transmission timing when UL-DL configuration #1 is configured. In the figure, SF#0 to #9 and SF#10 to #19 respectively correspond to radio frames, and numerals in blocks denote UL subframes relating to DL subframes. For example, a PUSCH corresponding to PHICH/UL grant of SF#6 is transmitted in SF#6+6 (=SF#12) and a PUSCH corresponding to a PHICH/UL grant of SF#14 is transmitted in SF#14+4 (=SF#18).

Figure 9:
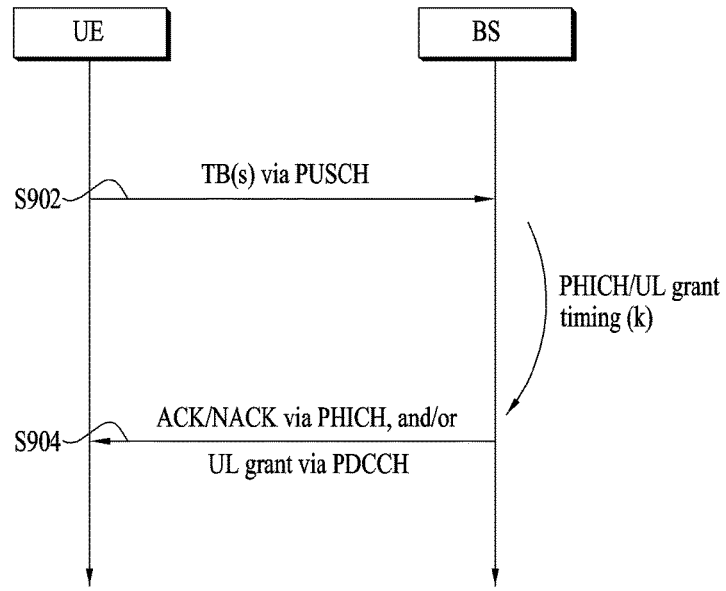
FIGS. 9 and 10 illustrate TDD DL ACK/NACK transmission timing in a single cell case.
Figure 10:
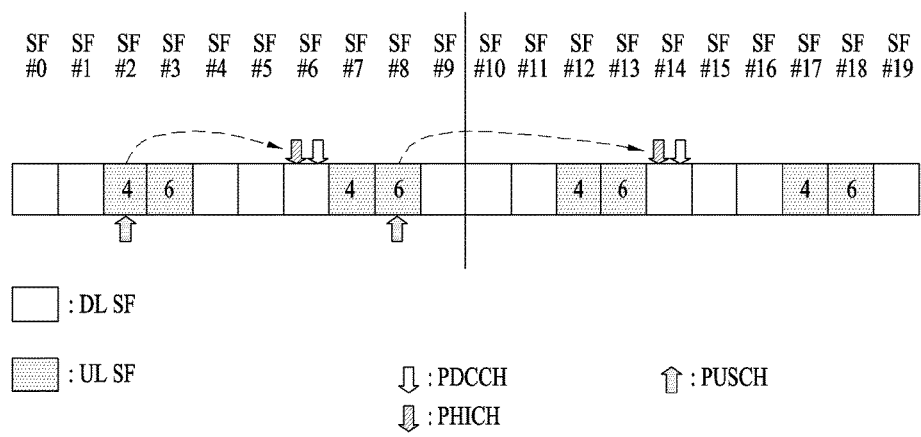

FIGS. 9 and 10 illustrate PUSCH-PHICH/UL grant timing. A PHICH is used to transmit DL ACK/NACK. Here, DL ACK/NACK means ACK/NACK transmitted on downlink as a response to UL data (e.g. PUSCH).

Referring to FIG. 9, the UE transmits a PUSCH signal to the BS (S902). Here, the PUSCH signal is used to transmit one or a plurality of (e.g. 2) TBs according to transmission mode. The BS can transmit ACK/NACK as a response to PUSCH transmission through a PHICH after k subframes via processes for ACK/NACK transmission (e.g. ACK/NACK generation, ACK/NACK resource allocation, etc.) (S904). ACK/NACK includes acknowledgement information about the PUSCH signal of step S902. When a response to PUSCH transmission is NACK, the BS can transmit a UL grant PDCCH for PUSCH retransmission to the UE after k subframe (S904). The present embodiment is based on the assumption that a normal HARQ operation in which a PUSCH is transmitted once is performed. In this case, a PHICH and UL grant used for PUSCH transmission can be transmitted in the same subframe. In case of subframe bundling, however, the PHICH and UL grant used for PUSCH transmission can be transmitted in different subframes.

Table 5 shows a UAI for PHICH/UL grant transmission in LTE(-A). Table 5 shows spacing between a DL subframe in which a PHICH/UL grant is present and a UL subframe relating to the DL subframe. Specifically, a PHICH/UL grant of a subframe i corresponds to PUSCH transmission through a subframe i–k.

TABLE 5

| TDD UL-DL Config-uration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | | | 7 | 4 | | | | 7 | 4 | |
| 1 | | | 4 | | | 6 | | | 4 | 6 |
| 2 | | | | 6 | | | | | 6 | |
| 3 | 6 | | | | | | | | 6 | 6 |
| 4 | | | | | | | | | 6 | 6 |
| 5 | | | | | | | | | 6 | |
| 6 | 6 | | 4 | | | | 7 | 4 | | 6 |

FIG. 10 illustrates PHICH/UL grant transmission timing when UL-DL configuration #1 is configured. In the figure, SF#0 to #9 and SF#10 to #19 respectively correspond to radio frames, and numerals in blocks denote DL subframes relating to UL subframes. For example, a PHICH/UL grant corresponding to a PUSCH of SF#2 is transmitted in SF#2+4 (=SF#6) and a PHICH/UL grant corresponding to a PUSCH of SF#8 is transmitted in SF#8+6 (=SF#14).

PHICH resource allocation will now be described. When a PUSCH is transmitted in subframe #n, the UE determines a PHICH resource corresponding to the PUSCH in subframe #(n+kPHICH). In case of FDD, kPHICH has a fixed value (e.g. 4). In case of TDD, kPHICH has a value depending on UL-DL configuration. Table 6 shows kPHICH for TDD is equivalent to Table 5.

TABLE 6

| TDD UL-DL Config-uration | UL subframe index n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | S | | | | 6 | | | |
| 3 | | | | 6 | 6 | 6 | | | | |
| 4 | | | | 6 | 6 | | | | | |
| 5 | | | | 6 | | | | | | |
| 6 | | | 4 | 6 | 6 | | | 4 | 7 | |

A PHICH resource is provided by [PHICH group index, orthogonal sequence index]. The PHICH group index and the orthogonal sequence index are determined using (i) a lowest PRB index used for PUSCH transmission and (ii) a 3-bit field value for DMRS (Demodulation Reference Signal) cyclic shift. Here, (i) and (ii) are indicated by a UL grant PDCCH.

A description will be given of a HARQ process. The UE executes a plurality of parallel HARQ processes for UL transmission. The plurality of parallel HARQ processes is used to continuously perform UL transmission while the UE waits for HARQ feedback representing whether previous UL transmission has been successful or not. Each HARQ process relates to a HARQ buffer of a MAC (Medium Access Control) layer. Each HARQ process manages the number of transmissions of a MAC PDU (Physical Data Unit) in the buffer, HARQ feedback for the MAC PDU in the buffer, and a state parameter regarding a current redundancy version.

In case of LTE(-A) FDD, the number of UL HARQ processes for non-subframe bundling operation (i.e. normal HARQ operation) is 8. In case of LTE(-A) TDD, the number of UL HARQ processes and HARQ RTT (Round Trip Time) are configured differently according to DL-UL configurations because the number of UL subframes depends on UL-DL configuration. Here, the HARQ RTT may be a time interval (in the unit of SF or ms, for example) between a time when a UL grant is received and a time when a PHICH (corresponding to the UL grant) is received through transmission of a PUSCH (corresponding the UL grant) or a time interval between a PUSCH transmission time and a PUSCH retransmission time.

The number of UL HARQ processes varies. When subframe bundling is applied, a bundle of PUSCHs configured of 4 contiguous UL subframes is transmitted in FDD and TDD. Accordingly, a HARQ operation/process when subframe bundling is applied is different from the normal HARQ operation/process.

Table 8 shows the number of synchronous UL HARQ processes and HARQ RTT in TDD. When the UL HARQ RTT is 10 [SFs or ms] (UL-DL configurations #1, #2, #3, #4 and #5), one UL HARQ process uses one fixed UL SF timing. When the UL HARQ RTT does not correspond to 10 [SFs or ms] (UL-DL configurations #0 and #6), one UL HARQ process uses a plurality of UL SF timings (instead of one fixed UL SF timing) while hopping. For example, in case of UL-DL configuration #6, PUSCH transmission timings in one UL HARQ process are: SF #2: PUSCH=> SF #13 : PUSCH (RTT: 11 SFs)=>SF #24: PUSCH (RTT: 11 SFs)=>SF #37: PUSCH (RTT: 13 SFs)=>SF #48: PUSCH (RTT: 11 SFs)=>SF #52: PUSCH (RTT: 14 SFs).

TABLE 8

| UL-DL configuration | Number of UL SFs | Number of HARQ processes for normal HARQ operation | HARQ RTT |
|---|---|---|---|
| 0 | 6 | 7 | 11 or 13 |
| 1 | 4 | 4 | 10 |
| 2 | 2 | 2 | 10 |
| 3 | 3 | 3 | 10 |
| 4 | 2 | 2 | 10 |
| 5 | 1 | 1 | 10 |
| 6 | 5 | 6 | 11 or 13 or 14 |

In case of TDD UL-DL configurations #1 to #6 and normal HARQ operation, the UE transmits a corresponding PUSCH signal in subframe n+k (refer to Table 5) according to UL grant PDCCH and/or PHICH information upon detection of the UL grant PDCCH and/or PHICH information in subframe n.

In case of TDD UL-DL configuration #0 and the normal HARQ operation, when a UL DCI grant PDCCH and/or a PHICH are detected from subframe n, PUSCH transmission timing of the UE is varied according to conditions. When the MSB (Most Significant bit) of a UL index in DCI is 1 or the PHICH is received through a resource corresponding to $I_{PHICH}=0$ in subframe #0 or #5, the UE transmits the corresponding PUSCH signal in subframe n+k (refer to Table 5). When the LSB (Least Significant bit) of the UL index in the DCI is 1, the PHICH is received through a resource corresponding to $I_{PHICH}=1$ in subframe #0 or #5, or the PHICH is received in subframe #1 or #6, UE transmits the corresponding PUSCH signal in subframe n+7. When both the MSB and LSB in the DCI are set, the UE transmits the corresponding PUSCH signal in subframe n+k (refer to Table 5) and subframe n+7.

Figure 11:
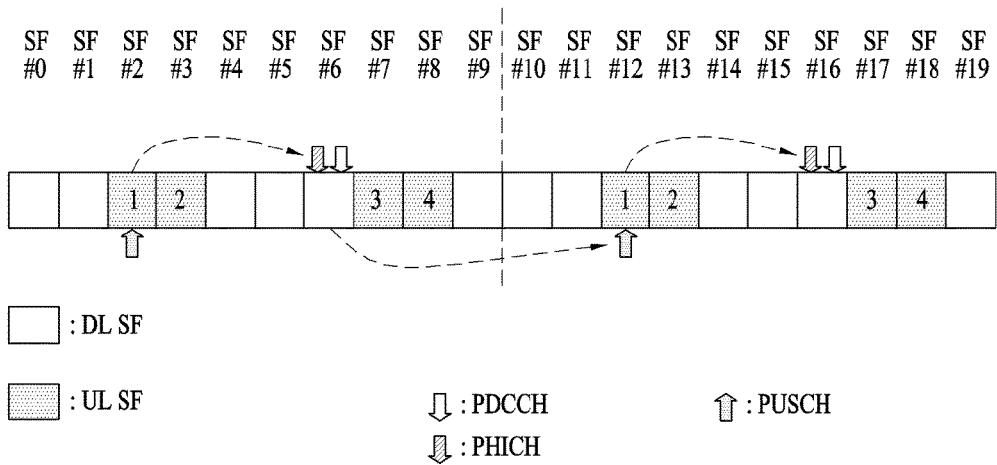
FIG. 11 illustrates a TDD HARQ (Hybrid Automatic Repeat request) process in a single cell situation.

FIG. 11 illustrates a synchronous UL HARQ process when UL-DL configuration #1 is configured. Numerals in blocks denote UL HARQ process numbers. The synchronous UL HARQ process shown in FIG. 11 corresponds to a normal HARQ process. Referring to FIG. 11, HARQ process #1 involves SF#2, SF#6, SF#12 and SF#16. For example, if an initial PUSCH signal (e.g. RV=0) is transmitted in SF#2, a UL grant PDCCH and/or a PHICH corresponding to the PUSCH signal can be received in SF#6 and a (retransmission) PUSCH signal (e.g. RV=2) corresponding to the initial PUSCH signal can be transmitted in SF#12. Accordingly, 4 UL HARQ processes having an RTT (Round Trip Time) of 10 SFs (or 10 ms) are present in case of UL-DL configuration #1.

Transmit Power Control

Various parameters are used to control UL transmit power of a UE. These parameters may be divided into open loop power control (OLPC) parameters and closed loop power control (CLPC) parameters. OLPC may be viewed as a factor for controlling power by estimating and compensating for attenuation of a DL signal from a serving cell (or a serving base station) to which the UE belongs. For example, when the distance from the UE to the serving cell increases, and thus attenuation of the DL signal is worsened, the UL transmit power may be controlled such that the UL transmit power increases. CLPC is used to control UL power by allowing the base station to directly deliver information (e.g., a transmit power control (TPC) command) needed to adjust the UL transmit power. UL transmit power control is performed by considering OLPC and CLPC together.

As a specific example, determination of PUSCH transmit power for PUSCH transmission of a UE will be discussed below. Equation 1 given below is used to determine the transmit power of the UE when PUSCH and PUCCH are not transmitted simultaneously in subframe #i of the serving cell c, but only PUSCH is transmitted.

[Equation 1]
$$P_{PUSCH,c}(i) = \min\left\{\begin{array}{l}P_{CMAX,c}(i),\\10\log_{10}(M_{PUSCH,c}(i)) + P_{O\_PUSCH,c}(j) +\\ \alpha_c(j) \cdot PL_c + \Delta_{TF,c}(i) + f_c(i)\end{array}\right\}$$ [dBm]

Next, Equation 2 given below is used to determine PUSCH transmit power when PUCCH and PUSCH are transmitted simultaneously in subframe #i of the serving cell c.

[Equation 2]
$$P_{PUSCH,c}(i) = \min\left\{\begin{array}{l}10\log_{10}(\hat{P}_{CMAX,c}(i) - \hat{P}_{PUCCH}(i)),\\10\log_{10}(M_{PUSCH,c}(i)) + P_{O\_PUSCH,c}(j) +\\ \alpha_c(j) \cdot PL_c + \Delta_{TF,c}(i) + f_c(i)\end{array}\right\}$$ [dBm]

Parameters described below in relation to Equation 1 and Equation 2 determine the UL transmit power of the UE in the serving cell c. Herein, $P_{CMAX,c}(i)$ of Equation 1 denotes the maximum transmittable power of the UE in subframe #i, and $\hat{P}_{CMAX,c}(i)$ of Equation 2 denotes a linear value of $P_{CMAX,c}$.

In Equation 2, $\hat{P}_{PUCCH}(i)$ denotes a linear value of $P_{PUCCH}(i)$ (wherein $P_{PUCCH}(i)$ indicates PUCCH transmit power in subframe #i).

In Equation 1, $M_{PUSCH,c}(i)$ is a parameter indicating the bandwidth for PUSCH resource allocation expressed as the number of valid RBs with respect to subframe #i. The value of this parameter is allocated by the eNB. $P_{O\_PUSCH,c}(j)$ is a parameter configured by a sum of a cell-specific nominal component $P_{O\_NOMINAL\_PUSCH,c}(j)$ provided by a higher layer and a UE-specific component $P_{O\_UE\_PUSCH,c}(j)$ provided by the higher layer. The value of this parameter is signaled to the UE by the eNB. For PUSCH transmission/retransmission corresponding to a dynamically scheduled grant, j=1. For PUSCH transmission/retransmission corresponding to a random access response grant, j=2. and $P_{O\_NOMINAL\_PUSCH,c}(2) = P_{O\_PRE} + \Delta_{PREAMBLE\_Msg3}$. Herein, parameters preambleInitialReceivedTargetPower ($P_{O\_PRE}$) and $\Delta_{PREAMBLE\_Msg3}$ are signaled by a higher layer.

$\alpha_c(j)$, which is a path loss compensation factor, is a cell-specific parameter provided by a higher layer and transmitted in 3 bits by a base station. When j=0 or 1, $\alpha_c \in \{0, 0.4, 0.5, 0.6, 0.7, 0.8, 0.9, 1\}$. When j=2, $\alpha_c(j)=1$. $\alpha_c(j)$ is a value signaled to the UE by the base station.

$PL_c$ is an estimate of a downlink path loss (or a signal loss) calculated in dB by the UE, and is expressed as $PL_c$=referenceSignalPower−higher layer filtered RSRP (reference signal received power). Herein, the base station may inform the UE of referenceSignalPower through a higher layer.

$f_c(i)$ is a value indicating a current PUSCH power control adjustment state for the subframe #i, and may be expressed as a current absolute value or accumulated value. When accumulation is enabled based on a parameter Accumulation-enabled provided from a higher layer, or when a TPC command $\delta_{PUSCH,c}$ is included in a PDCCH together with DCI format 0 for a serving cell c for which CRC is scrambled as a temporary C-RNTI, an equation $f_c(i)=f_c(i-1)+\delta_{PUSCH,c}(i-K_{PUSCH})$ is satisfied. $\delta_{PUSCH,c}(i-K_{PUSCH})$ is signaled over the PDCCH in subframe i−$K_{PUSCH}$ together with DCI format 0/4 or 3/3A. Herein, $f_c(0)$ is the first value after an accumulated value is reset.

In the LTE standard, the value of $K_{PUSCH}$ is defined as follows.

For FDD, $K_{PUSCH}$ is 4. For TDD UL-DL configurations 0-6, the values of $K_{PUSCH}$ are given as shown in Table 8 below. For TDD UL-DL configuration 0, the least significant bit (LSB) of the UL index is set to 1. When PUSCH transmission is scheduled along with PDCCH of DCI format 0/4 in subframe 2 or 7, $K_{PUSCH}$=7. For other PUSCH transmissions, the values of $K_{PUSCH}$ are given in Table 8.

TABLE 8

| TDD UL-DL Configuration | Subframe number i | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 7 | 4 | — | — | 6 | 7 | 4 |
| 1 | — | — | 6 | 4 | — | — | — | 6 | 4 | — |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7 | — |

Except for the case of discontinuous reception (DRX), the UE attempts to decode a PDCCH of DCI format 0/4 using the C-RNTI of the UE or to decode a DCI format for an SPS C-RNTI and a PDCCH of DCI format 3/3A using the TPC-PUSCH-RNTI of the UE in each subframe. When DCI format 0/4 and DCI format 3/3A for the serving cell c are detected in the same subframe, the terminal should use $\delta_{PUSCH,c}$ provided in DCI format 0/4. For a subframe in which a TPC command decoded for the serving cell c is absent or DRX occurs or a subframe indicated by an index i and not used as a UL subframe in TDD, $\delta_{PUSCH,c}=0$ dB.

An accumulated value $\delta_{PUSCH,c}$ signaled on PDCCH together with DCI format 0/4 is shown in Table 9 given below. When the PDCCH together with DCI format 0 is validated by SPS activation or the PDCCH is released, $\delta_{PUSCH,c}=0$ dB. An accumulated value $\delta_{PUSCH,c}$ signaled on PDCCH together with DCI format 3/3A corresponds to a SET1 of Table 9, or a SET2 of Table 10 determined by a TPC-index parameter provided by a higher layer.

TABLE 9

| TPC Command Field in DCI format 0/3/4 | Accumulated $\delta_{PUSCH,c}$ [dB] | Absolute $\delta_{PUSCH,c}$ [dB] only DCI format 0/4 |
|---|---|---|
| 0 | −1 | −4 |
| 1 | 0 | −1 |
| 2 | 1 | 1 |
| 3 | 3 | 4 |

TABLE 10

| TPC Command Field in DCI format 3A | Accumulated $\delta_{PUSCH,c}$ [dB] |
|---|---|
| 0 | −1 |
| 1 | 1 |

When the UE reaches a maximum transmit power $P_{CMAX,c}$ (i) in the serving cell c, a positive TPC command is not accumulated for the serving cell c. On the other hand, when UE reaches a minimum maximum power, a negative TPC command is not accumulated.

The UE resets accumulation when the value $P_{O\_UE\_PUSCH,c}(j)$ is changed by a higher layer or the UE receives a random access response message in a primary cell.

If accumulation is not enabled based on the parameter Accumulation-enabled provided from a higher layer, the equation $f_c(i)=\delta_{PUSCH,c}(i-K_{PUSCH})$ is satisfied. Herein, $\delta_{PUSCH,c}(i-K_{PUSCH})$ is signaled together with DCI format 0/4 on PDCCH in subframe $i-K_{PUSCH}$.

The value of $K_{PUSCH}$ is given as follows. $K_{PUSCH}$ is 4 for FDD. For TDD UL-DL configurations 1-6, the values of $K_{PUSCH}$ are given in Table 8 below. For TDD UL-DL configuration 0, the least significant bit (LSB) of the UL index is set to 1. When PUSCH transmission is scheduled along with PDCCH of DCI format 0/4 in subframe 2 or 7, $K_{PUSCH}=7$. For the other PUSCH transmissions, the values of $K_{PUSCH}$ are given in Table 8.

The accumulated value $\delta_{PUSCH,c}$ signaled on PDCCH together with DCI format 0/4 is given in Table 9. When the PDCCH together with DCI format 0 is validated by SPS activation or the PDCCH is released, $\delta_{PUSCH,c}=0$ dB.

For a subframe in which a PDCCH accompanied by a DCI format decoded for the serving cell c is absent or DRX occurs, or a subframe indicated by an index i but not used as a UL subframe in TDD, $f_c(i)=f_c(i-1)$.

For two types of $f_c(*)$ (an accumulated value or a current absolute value), the first value is set as follows.

For the serving cell c, if the value $P_{O\_UE\_PUSCH,c}$ is changed by a higher layer or if the value $P_{O\_UE\_PUSCH,c}$ is received by a higher layer, and the serving cell c is a secondary cell, $f_c(0)=0$. Conversely, if the serving cell is a primary cell, $f_c(0)=\Delta P_{rampup}+\delta_{msg2}$, wherein $\delta_{msg2}$ is a TPC command indicated in a random access response, and $\Delta P_{rampup}$, provided by a higher layer, corresponds to a total power ramp-up from the first to last preambles.

In the related art of the present invention, when the TPC command operates in an accumulated mode in UL power control (ULPC), the accumulated value is set to operate as follows. For the serving cell c, when the value $P_{O\_UE\_PUSCH,c}(j)$ is changed by a higher layer or when the UE receives a random access response message in a primary cell, the UE should reset accumulation in the following case.

Equation 3 below is related to ULPC for PUCCH.

$$P_{PUCCH}(i) = \min\left\{\begin{array}{l} P_{CMAX,c}(i), \\ P_{0\_PUCCH} + PL_c + h(n_{CQI}, n_{HARQ}, n_{SR}) + \\ \Delta_{F\_PUCCH}(F) + \Delta_{TxD}(F') + g(i) \end{array}\right\} \text{[dBm]}$$

[Equation 3]

In Equation 3, i denotes a subframe index, and c denotes a cell index. If the UE is set by a higher layer to transmit a PUCCH on two antenna ports, the value $\Delta_{TxD}$ (F') is provided to the UE by the higher layer. Otherwise, 0 is provided. A parameter described below is a parameter for a serving cell having a cell index c.

Herein, $P_{CMAX,c}$ denotes maximum UE transmit power, $P_{O\_PUCCH}$ denotes a parameter including a sum of cell-specific parameters and is reported by a base station through higher layer signaling, and $PL_c$ is an estimate of downlink path loss (or signal loss) calculated in dB by the UE and is expressed as $PL_c$=referenceSignalPower−higher layer filtered RSRP. h(n) has a value varying with a PUCCH format, $n_{CQI}$ denotes the number of information bits for CQI, and $n_{HARQ}$ denotes the number of HARQ bits. $\Delta_{F\_PUCCH}(F)$ is a relative value with respect to PUCCH format 1a, and is reported by the base station through higher layer signaling as a value corresponding to a PUCCH format #F.

g(i) denotes a current PUCCH power control adjustment state of a subframe having an index i and may be defined as $$g(i) = g(i-1) + \sum_{m=0}^{M-1} \delta_{PUCCH}(i - k_m).$$

Herein, $\delta_{PUCCH}$ may be assigned a value according to Table 11 or Table 12 shown below, and M denotes the number of DL subframes associated with one UL subframe (see Table 3).

$h(n_{CQI}, n_{HARQ}, n_{SR})$ is 1 for PUCCH formats 1, 1a and 1b. For PUCCH format 1b, if more than one serving cell is configured for the UE, $$h(n_{CQI}, n_{HARQ}, n_{SR}) = \frac{(n_{HARQ} - 1)}{2}.$$

Otherwise, $h(n_{CQI}, n_{HARQ}, n_{SR})$ is 0. For a normal cyclic prefix (CP) for PUCCH formats 2, 2a, and 2b, $h(n_{CQI}, n_{HARQ}, n_{SR})$ may be expressed by Equation 4 below. For an extended CP for PUCCH format 2, h($n_{CQI}$, $n_{HARQ}$, $n_{SR}$) may be expressed by Equation 5 below.

$$h(n_{CQI}, n_{HARQ}, n_{SR}) = \begin{cases} 10\log_{10}\left(\frac{n_{CQI}}{4}\right) & \text{if } n_{CQI} \geq 4 \\ 0 & \text{otherwise} \end{cases} \quad \text{[Equation 4]}$$

$$h(n_{CQI}, n_{HARQ}, n_{SR}) = \quad \text{[Equation 5]}$$
$$\begin{cases} 10\log_{10}\left(\frac{n_{CQI} + n_{HARQ}}{4}\right) & \text{if } n_{CQI} + n_{HARQ} \geq 4 \\ 0 & \text{otherwise} \end{cases}$$

For PUCCH format 3, if the UE transmits HARQ-ACK/NACK or scheduling request (SR) with 11 or more bits, h($n_{CQI}$, $n_{HARQ}$, $n_{SR}$) may be expressed by Equation 6 given below. Otherwise, h($n_{CQI}$, $n_{HARQ}$, $n_{SR}$) may be expressed by Equation 7 below.

$$h(n_{CQI}, n_{HARQ}, n_{SR}) = \frac{n_{HARQ} + n_{SR} - 1}{3} \quad \text{[Equation 6]}$$

$$h(n_{CQI}, n_{HARQ}, n_{SR}) = \frac{n_{HARQ} + n_{SR} - 1}{2} \quad \text{[Equation 7]}$$

If $P_{O\_UE\_PUCCH}$ is changed by a higher layer, g(0)=0. Otherwise, g(0)=$\Delta P_{rampup}$+$\delta_{msg2}$, wherein $\delta_{msg2}$ is a TPC command indicated in a random access response, and $\Delta P_{rampup}$, provided by a higher layer, corresponds to a total power ramp-up from the first to last preambles.

When the UE reaches the maximum transmit power $P_{CMAX,c}(i)$ in a primary cell c, a positive TPC command is not accumulated for the primary cell c. On the other hand, when the UE reaches the minimum power, a negative TPC command is not accumulated. The UE resets accumulation when the value $P_{O\_UE\_PUCCH}$ is changed by a higher layer or the UE receives a random access response message (msg2).

Table 11 and Table 12 given below show values of $\delta_{PUCCH}$ in the TPC command field in DCI formats.

TABLE 11

| TPC Command Field in DCI format 1A/1B/1D/1/2A/2B/2C/2/3 | $\delta_{PUCCH}$ [dB] |
|---|---|
| 0 | −1 |
| 1 | 0 |
| 2 | 1 |
| 3 | 3 |

TABLE 12

| TPC Command Field in DCI format 3A | $\delta_{PUCCH}$ [dB] |
|---|---|
| 0 | −1 |
| 1 | 1 |

Method for Dynamic Resource Allocation and ULPC

The present invention proposes examples for supporting DL-UL interference management and traffic adaptation (IMTA) as an improved method for switching between uses of DL-UL resources. In particular, the present invention provides a method for ULPC in dynamically establishing a DL-UL configuration in TDD.

If dynamic switching between uses of DL-UL resources is not supported, optimum resource distribution may be performed between DL and UL at every time (or in every subframe) when the sizes of the DL traffic and UL traffic change dynamically.

For example, an FDD system is operated by dividing the frequency band into a DL band and a UL band. To implement such dynamic switching between resource uses, an eNB may announce, via a radio resource control (RRC) layer signal, a medium access control (MAC) layer signal, or a physical (PHY) layer signal, whether a specific band is allocated to DL resources or UL resources at a specific time.

Meanwhile, for the TDD system, all subframes may be divided into UL subframes and DL subframes, and each subframe may be used for UL transmission of the UE or DL transmission of the eNB. Such UL-DL configuration is generally included in system information and provided to the UE. For example, one of the UL-DL configurations shown in Table 1 may be semi-statically applied. In addition to UL-DL configurations 0-6 defined in Table 1, other UL-DL configurations may be defined. In the TDD system, to implement dynamic switching between resource uses, the eNB may announce, via an RRC layer signal, a MAC layer signal, or a PHY layer signal, whether a specific subframe is allocated to DL resources or UL resources at a specific time.

As described above, in the legacy LTE/LTE-A system, DL resources and UL resources are designated through the system information. The system information is information that should be applied to multiple UEs in a cell in common. Accordingly, when configurations of a DL resource and a UL resource are dynamically changed/switched, a problem may occur with operation of legacy UEs (e.g., UEs that do not support dynamic change of UL-DL configurations). Accordingly, a method to provide information about dynamic resource use switching needs to be defined not only by signaling for delivering the system information but also by new signaling. In addition, the method needs to be defined by UE-dedicated (or UE-specific) signaling for UEs currently maintaining connection to the eNB. Dynamic resource use switching may be indicated using such new signaling (e.g., in the TDD mode, a UL-DL configuration different from the configuration established through the system information is designated).

New signaling for supporting dynamic resource use switching may contain information related to HARQ. For example, when a relationship between a series of HARQ timings defined by a scheduling message, a PDSCH/PUSCH transmission/reception time determined according to the message and a corresponding HARQ-ACK/NACK transmission/reception time is defined as a HARQ timeline, the HARQ timeline may not be correctly retained due to dynamic switching of resource uses. To prevent this problem, the new signaling for supporting dynamic switching of resource uses may contain information about HARQ timeline configuration capable of correctly retaining the HARQ timeline even if dynamic switching of resource uses is applied. For example, for the TDD system, such HARQ timeline configuration information may be given as a UL-DL configuration (e.g., one of the UL-DL configurations in Table 1) that is referenced when the DL HARQ and/or UL HARQ timeline is defined.

A UE accessing a system supporting dynamic switching of resource uses may receive various kinds of information about the resource configuration. For example, in TDD, a UE may acquire at least one of the following configuration signalings 1 to 4 at a specific time.

Configuration signaling 1: A UL-DL configuration indicated by the system information.

Configuration signaling 2: A UL-DL configuration delivered through signaling separate from the system information signaling to indicate use of each subframe.

Configuration signaling 3: A UL-DL configuration delivered to define a DL HARQ timeline (i.e., when to transmit UL HARQ-ACK for a PDSCH received at a specific time).

Configuration signaling 4: A UL-DL configuration delivered to define a UL HARQ timeline (i.e., when to transmit a PUSCH for a UL grant received at a specific time and when to receive a PHICH for the PUSCH transmitted at a specific time).

A configuration for dynamic switching of resource uses provided by Configuration signaling 2, 3 or 4 may be understood as temporarily overriding the configuration of the system information provided by Configuration signaling 1.

Once the UE accesses an eNB supporting dynamic switching of resource uses, it is advantageous for the eNB to designate as many UL subframes (UL SFs) as possible through the system information. This is because there are limitations on dynamically switching a subframe set as a DL subframe (DL SF) in the system information to a UL SF, compared to dynamically switching a subframe set as a UL SF in the system information to a DL SF. Specifically, legacy UEs operate on the assumption that a cell-specific reference signal (CRS) transmitted from the base station will be received in a subframe designated as a DL SF in the system information. However, if this subframe is set as a UL SF by dynamic switching of resource uses, the CRS is not transmitted, and thus a large error may occur in CSI generation and/or data demodulation, which the legacy UEs perform based on the CRS. Accordingly, it is preferably for the eNB to designate as many UL SFs as possible through the system information and to dynamically switch some of the UL SFs to DL SFs when DL traffic increases.

In an example of the TDD system operating according to the principle described above, while the UE is informed that UL-DL configuration #0 of Table 1 is applied at a specific time according to the system information, the actual resource use in each subframe may be indicated to conform to UL-DL configuration #1. In addition, it may be indicated that UL-DL configuration #2 is applied as a reference of a DL HARQ timeline. If a configuration having a larger number of DL SFs than the number of UL SFs is taken as a reference of the DL HARQ timeline as above, the DL HARQ timeline is very likely to be retained even if dynamic switching of resource uses is performed. In addition, it may be indicated that UL-DL configuration #0 is applied as the reference of UL HARQ timeline. If a configuration having a larger number of UL SFs than the number of DL SFs is taken as a reference of the UL HARQ timeline as above, the UL HARQ timeline is very likely to be retained even if dynamic switching of resource uses is performed.

In an environment in which the dynamic switching of resource uses is applicable, the conventional UL transmit power control method for the UE may cause many problems since it does not consider dynamic switching of resource uses. When it is assumed that a subframe set as a DL SF by the system information is set as a UL SF by dynamic switching of resource uses and UL transmission is performed in the subframe, the subframe may have an interference environment significantly different from that of a normal UL SF as the subframe is used as a DL SF in a neighboring cell. In conventional cases, UL transmit power control does not consider the aforementioned situation. Accordingly, if the conventional UL transmit power control is applied as it is, UL transmission performance may be significantly lowered.

Accordingly, the present invention proposes a new UL power control method which may be used in an environment in which a power control scheme needs to be separately applied for each specific UL transmission as in the case where the UE establishes access to a system supporting dynamic switching of resource uses.

Embodiment 1

In this embodiment, a plurality of subframe sets is configured and a different power control scheme is applied to each subframe set. The configuration information about the plurality of subframe sets may be provided to the UE through higher layer (e.g., RRC) signaling. For example, conventionally defined subframe set configuration information (e.g., an almost blank subframe (ABS)/normal subframe configured for enhanced inter-cell interference coordination (eICIC)) may be applied or configuration based thereon may be established. Alternatively, a signaling scheme for separate use similar to the signaling scheme for the subframe set configuration may be defined.

Further, configuration for a plurality of subframe sets may form the basis of applying different UL TPC schemes. For example, when the UE receives signaling for triggering an aperiodic CSI report in subframe t and transmits aperiodic CSI feedback to the eNB in response in subframe r, different TPC schemes may be applied depending on a subframe set to which the subframe t or subframe r belongs.

For simplicity, it will be assumed herein below that two different subframe sets are configured. However, the scope of the present invention is not limited thereto. Configuring three or more subframe sets is also within the scope of the present invention.

The two different subframe sets proposed in the present invention will be referred to as "SF Set 0" and "SF Set 1". SF Set 0 and SF Set 1 may be defined using an L-bit subframe bitmap. The value of L may be determined according to a periodicity of the subframe set configuration. For example, L may be set to 40 in FDD and set to 60 or 70 in TDD depending on the UL-DL configuration, as in the conventional ABS configuration scheme, but embodiments of the present invention are not limited thereto.

The proposed multiple subframe sets may be configured according to a subframe attribute. For example, one of SF Set 0 and SF Set 1 may be defined as a set including subframes whose purpose of use is statically set (i.e., "Static SFs"), and the other may be defined as a set including subframes whose purpose of use is flexibly set (i.e., "Flexible SFs").

Figure 12:
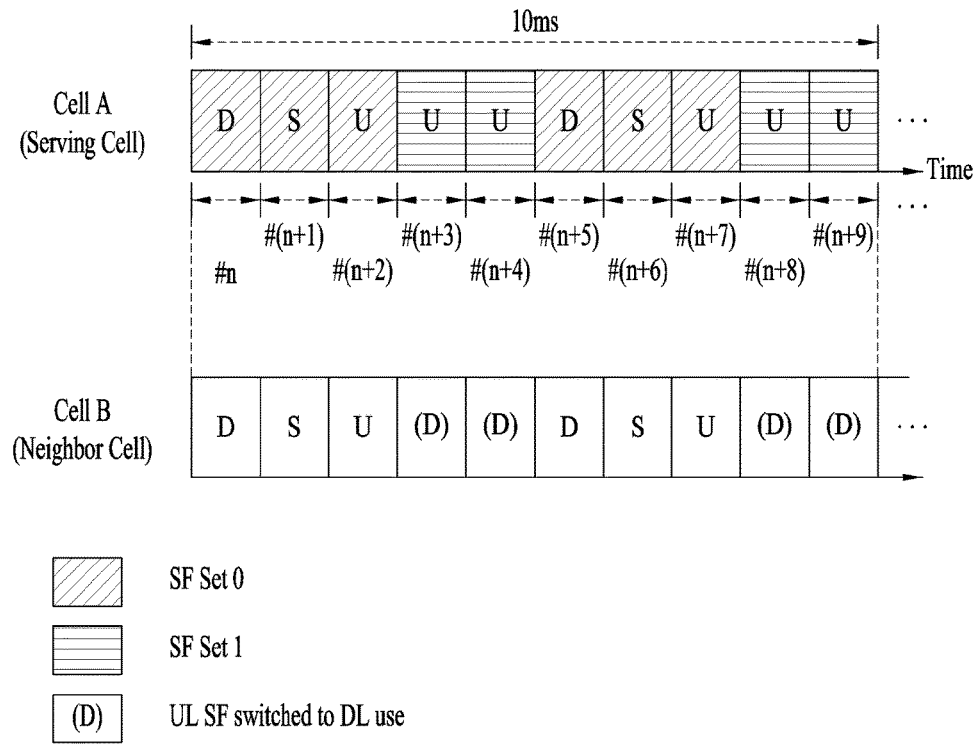
FIG. 12 illustrates configuration of subframe sets according to an embodiment of the present invention.

Specifically, the static SFs may refer to SFs such as conventional SFs to which dynamic switching of resource uses is not applied (for example, SFs for which DL or UL use set by the system information is constantly retained) as in the case of SF Set 0 of FIG. 12. The flexible SFs may refer to SFs to which dynamic switching of resource uses is applied (or applicable) as in the case of SF Set 1 of FIG. 12.

As shown in FIG. 12, dynamic switching of resource uses may be applied in a serving cell and/or neighbor cell. For example, SF Set 1 includes SF #(n+3), #(n+4), #(n+8), #(n+9), . . . . These subframes may be used as UL resources as originally intended (i.e., as configured through the system information) in the serving cell, but may be used as DL resources in the neighbor cell according to dynamic switching of resource uses.

In flexible SFs such as SFs of SF Set 1, the interference environment may significantly change during UL transmission of the UE unlike in the static SFs, and thus a separate UL power control scheme different from the UL power control scheme applied in the static SFs is required.

In the example of FIG. 12, with UL-DL configuration #0 (i.e., DSUUUDSUUU) configured by Cell A (i.e., a serving cell) and Cell B (a neighbor cell) through SIB, Cell B dynamically switches SFs corresponding to indexes #(n+3), #(n+4), #(n+8), #(n+9), . . . to DL SFs.

In this case, Cell A configures SF Set 0 and SF Set 1 for UEs belonging to Cell A as illustrated in FIG. 12, and causes different power control schemes to be applied to the respective SF Sets. If inter-cell coordination is possible, when a specific cell applies dynamic switching of resource uses, neighbor cells may properly configure SF Sets in consideration of the dynamic switching. Alternatively, a pattern for SF Set configuration may be predefined between cells and the dynamic switching of resource uses may be pre-agreed to be applied only in a specific SF Set (e.g., SF Set 1 in FIG. 12).

As described above regarding the TPC operation with reference to Equations 1 to 7 and Tables 8 to 12, the current LTE/LTE-A standard defines a TPC field contained in DL-related DCI (e.g., DCI formats 1, 1A, 1B, 1D, 2, 2A, 2B, 2C, and 2D) to be applied as a CLPC TPC command for a PUCCH on which ACK/NACK for a PDSCH scheduled by the DCI is transmitted, and defines a TPC field contained in UL-related DCI (e.g., DCI formats 0 and 4) to be applied as a CLPC TPC command for a PUSCH scheduled by the DCI. That is, the power control (PC) process for PUCCH and the PC process for PUSCH operate independently and have a CLPC structure in which the processes are separately accumulated by a corresponding TPC command.

In this invention, application of a separate (or independent) PUSCH PC process distinguished from the conventional PUSCH PC process is proposed. The separate PUSCH PC process newly introduced in the present invention may be applied to resources (e.g., static SFs of SF Set 0 in FIG. 12) satisfying a predetermined condition.

For example, when the conventional PUSCH PC process is defined to operate according to Equation 1, the new separate PUSCH PC process may be defined to apply a separately set value to at least one of parameters (e.g., $P_{CMAX,c}(i)$, $M_{PUSCH,c}(i)$, $P_{O\_PUSCH,c}(j)$, $\alpha_c(j)$, $PL_c$, $\Delta_{TF,c}(i)$, $f_c(i)$) of Equation 1 (for example, the separate set value may be predetermined through RRC signaling).

For example, in Equation 1, two parameters $P_{O\_PUSCH,c}^{(0)}(j)$ and $f_c^{(0)}(i)$ may be separated and separate values thereof may be set through higher layer signaling. Herein, x in $P_{O\_PUSCH,c}^{(x)}(j)$ and $f_c^{(x)}(i)$ is an index (e.g., 0 or 1) of a subframe set and may be understood as a parameter applied to the subframe set.

In this case, $f_c^{(0)}(i)$ for the separate PUSCH PC process may be defined to be determined based on g(i) used in the PUCCH PC process in Equation 3 (e.g., $f_c^{(0)}(i)=g(i)$).

Since the PUCCH is a channel for transmitting important uplink control information (UCI) such as SR, HARQ-ACK/NACK and CSI, allowing the PUCCH to be transmitted on a resource (a flexible SF), which is likely to be switched for DL use, may degrade system performance. Accordingly, the PUCCH is preferably transmitted in a static SF. Accordingly, since the PUSCH PC process in the static SF is preferably operatively connected to the PC process for PUCCH, $f_c^{(0)}(i)$ for a separate PUSCH PC process may be operatively connected to g(i) (adjusted by the TPC field of the DL-related DCI) in the PUCCH PC process, such that CLPC accumulation is simultaneously applied.

Meanwhile, the conventional PUSCH PC process may be restricted to be applied only to SF Set 1 (e.g., flexible SFs). In this case, PUSCH TPC may operate such that parameter $f_c(i)$ given by the TPC field of the UL-related DCI as conventionally defined is accumulated independently of $f_c^{(0)}(i)$ which is applied to SF Set 0 (e.g., static SFs). Alternatively, as in the conventional PUSCH PC process, $f_c(i)$ given by the TPC field of the UL-related DCI may be defined as parameter $f_c^{(1)}(i)$ and treated as a parameter separate from $f_c^{(0)}(i)$.

It is also proposed that UL-DL configuration established by a higher layer (e.g., a UL-DL configuration established by Configuration Signaling 3 and delivered to define a DL HARQ timeline) be applied in determining TPC accumulation for PUCCH. That is, it is proposed that PUCCH TPC be determined according to a UL-DL configuration for determining a DL HARQ timeline provided through RRC signaling rather than being determined according to a DL-UL configuration provided as system information. Herein, the DL HARQ timeline may be viewed as a DL HARQ reference configuration. When ACK/NACK for data received in M (M≥1) DL subframes is transmitted in one UL subframe, the M DL subframes may be referred to as a DL HARQ reference for one UL subframe.

For example, in PUCCH TPC, if a UL-DL configuration for defining DL HARQ timeline is signaled by a higher layer, this may mean that a PUCCH for transmitting dynamic ACK/NACK is restricted to be transmitted only in SF Set 0 (e.g., static SFs) in which the separate PUCCH PC process is applied. In other words, for DL HARQ PUCCH TPC, the time to apply TPC of DL HARQ PUCCH is determined based on a DL HARQ reference configuration delivered from the higher layer, and therefore TPC command information to be applied in performing PUCCH transmission may change depending on DL HARQ reference configuration.

Specifically, a specific UL-DL configuration in Table 1 may be established as DL HARQ reference configuration information through higher layer (e.g., RRC) signaling. The specific UL-DL configuration may be, for example, one of UL-DL configurations #2, #4 and #5. This is because UL-DL configurations #2, #4 and #5 have one or two UL SFs in one radio frame, and thus number of UL SFs therefor is relatively small compared to the number of UL SFs for the other UL-DL configurations. That is, in consideration that a smaller number of UL SFs is advantageous in maintaining the DL HARQ timeline as described above, one of UL-DL configurations #2, #4, and #5 having a relatively small number of UL SFs may be defined as the DL HARQ reference configuration.

Briefly, in an example of the present invention, a downlink association set index (DASI) K: $\{k_0, k_1, \ldots k_{M-1}\}$ for PUCCH TPC accumulation (e.g., calculation of g(i)) may be defined to be set according to a DL HARQ reference configuration established by a higher layer.

If given RRC signaling indicates that the DL HARQ reference configuration is UL-DL configuration #2 of Table 1, PUCCH TPC accumulation $$\left(\text{i.e., } g(i) = g(i-1) + \sum_{m=0}^{M-1} \delta_{PUCCH}(i-k_m)\right)$$

is applied according to DASI K information indicated by a row in Table 3 corresponding to UL-DL configuration #2. Specifically, in determining transmit power of PUCCH in SF #n by accumulating TPC information in SF #(n−k), if n=2, k=8, 7, 4, 6, and if n=7, k=8, 7, 4, 6.

If given RRC signaling indicates that the DL HARQ reference configuration is UL-DL configuration #4 of Table 1, PUCCH TPC accumulation $$\left(i.e., g(i) = g(i-1) + \sum_{m=0}^{M-1} \delta_{PUCCH}(i - k_m)\right)$$

is applied according to DASI K information indicated by a row in Table 3 corresponding to UL-DL configuration #4. Specifically, in determining transmit power of PUCCH in SF #n by accumulating TPC information in SF #(n−k), if n=2, k=12, 8, 7, 11, and if n=3, k=6, 5, 4, 70.

If given RRC signaling indicates that the DL HARQ reference configuration is UL-DL configuration #5 of Table 1, PUCCH TPC accumulation $$\left(i.e., g(i) = g(i-1) + \sum_{m=0}^{M-1} \delta_{PUCCH}(i - k_m)\right)$$

is applied according to DASI K information indicated by a row in Table 3 corresponding to UL-DL configuration #5. Specifically, in determining transmit power of PUCCH in SF #n by accumulating TPC information in SF #(n−k), if n=2, k=13, 12, 9, 8, 7, 5, 4, 11, 6.

According to the method of determining PUCCH TPC in consideration of the DL HARQ timeline as described above, the DL HARQ timeline may not be configured such that PUCCH ACK/NACK is transmitted in all available UL SFs configured for UL use by the system information. Rather, the DL HARQ timeline may be configured such that PUCCH ACK/NACK transmission is performed only in UL SFs belonging to a specific SF set (e.g., static SFs) among the available UL SFs, and not performed in UL SFs belonging to the other SF set (e.g., flexible SFs). There may be various embodiments of configuration of such DL HARQ timeline. Hereinafter, PUCCH ACK/NACK allowed by the DL HARQ timeline having the aforementioned property to be transmitted in only UL SFs belonging to a specific SF set (e.g., static SFs) is referred to simply as "SF-set-specific PUCCH A/N".

The reason for configuring a DL HARQ timeline for "SF-set-specific PUCCH A/N" is that the interference environment for PUCCH transmission is not constant due to possibility of application of dynamic switching of resource uses in the neighbor cells in a specific SF set (e.g., flexible SFs) and thus it may be difficult to control PUCCH power in such an environment. Accordingly, by restricting "SF-set-specific PUCCH A/N" transmission to be performed only in UL SFs belonging to a specific SF set (e.g., static SFs) in which the interference environment does not significantly change, PUCCH power control may be facilitated and performance may be ensured.

Meanwhile, configuration of a plurality of SF sets as proposed in the present invention may be explicitly signaled by a higher layer, or may be indirectly (implicitly) determined using information related to a UL-DL configuration established for another use. When the plurality of SF sets includes SF set 0, SF set 1, . . . , each SF set may be configured as follows.

For example, SF Set 0 (e.g., static SFs) may be defined as a set of SFs which are configured for UL use in a UL-DL configuration that forms the basis of defining the DL HARQ timeline. Specifically, the UE may basically have a UL-DL configuration established through the system information (or SIB), or may have a UL-DL configuration established through UE-dedicated RRC signaling for overriding a configuration established in the system information. Hereinafter, a UL-DL configuration that the UE should currently apply will be referred to as "actual UL-DL config". Meanwhile, as described above regarding Configuration signaling 3, the UE may have a UL-DL configuration delivered to define the DL HARQ timeline. Hereinafter, this configuration will be referred to as "DL-HARQ UL-DL config". For example, suppose that "actual UL-DL config" is set to UL-DL configuration #3 (i.e., DSUUUDDDDD), and "DL-HARQ UL-DL config" is set to UL-DL configuration #5 (i.e., DSUDDDDDDD). In this case, if explicit signaling for configuration of SF set 0 (e.g., Static SFs) is not separately given, only SF #n+2 configured for UL use in UL-DL configuration #5 may be implicitly determined to belong to SF set 0 with reference to "DL-HARQ UL-DL config".

Next, for SF set 1 (e.g., flexible SFs), the SFs configured for UL use in the "actual UL-DL config" except UL SFs belonging to SF set 0 may be defined as remaining UL SFs (or a part of the remaining UL SFs). For example, suppose that the "actual UL-DL config" is set to UL-DL configuration #3 (i.e., DSUUUDDDDD), and the "DL-HARQ UL-DL config" is set to UL-DL configuration #5 (i.e., DSUDDDDDDD). In this case, when explicit signaling for configuration of SF set 1 (e.g., flexible SFs) is not separately given, it may be implicitly determined that {SF #n+3, SF #n+4} other than SF#n+2 belonging to SF Set 0 may be determined to belong to SF Set 1 among SF #n+2, SF #n+3 and SF #n+4 configured for UL use in UL-DL configuration #3 which is set as the "actual UL-DL config".

Additionally, among the SFs configured for UL use in the "actual UL-DL config", a part of the remaining UL SFs other than UL SFs belonging to SF Set 0 may be configured as SF Set 1, and the others of the remaining UL SFs (or parts of the remaining UL SFs) may be configured as SF Set 2, SF Set 3, and the like. For example, in the example described above, when SF#n+3 and SF#n+4 are the remaining SFs, SF#n+3 may be configured to belong to SF Set 1, and SF#n+4 may be configured to belong to SF Set 2. In this case, signaling or a reference for distinguishing SF set 1, SF set 2, and the like may be required.

In the implicit indication scheme for configuration of a plurality of SF sets, PUCCH ACK/NACK is allowed to be actually transmitted only in SFs configured for UL use in the "DL-HARQ UL-DL config" even if separate signaling is not given. Accordingly, configuring these SFs as static SFs may prevent signaling overhead and facilitate application of subframe-set-specific power control proposed in the present invention.

In addition, since the SFs exemplarily configured as SF set 1 (e.g., flexible SFs) are dynamically switchable between UL and DL, a separate PUSCH PC process may be applied when the UE transmits PUSCH in these SFs.

Further, the implicit indication scheme for configuration of a plurality of SF sets is not limited to the SF-set-specific power control scheme proposed in the present invention, and may be utilized for SF-set-specific operations for SF sets implicitly indicated for other uses. For example, various operations including SF-set-specific interference measurement, SF-set-specific restrictive RRM (Radio Resource Management) (e.g., RSRP, RSRQ (Reference Signal Received Quality) or the like) and SF-set-specific CSI reporting may be performed according to the implicit SF set configuration scheme proposed in the present invention.

The aforementioned proposals of the present invention are summarized below.

If a conventional PUSCH PC process applied to a specific SF set (e.g., SF set 1; flexible SFs) is allowed to be applied to other specific SF sets (e.g., SF set 0; static SFs), degradation of performance may occur due to the interference environment significantly changing among the respective SF sets. Accordingly, a separate PUSCH PC process may be applied in each SF set. In addition, by operatively connecting an independent TPC command to be applied for a specific SF set (e.g., SF set 0; static SFs) to PUCCH TPC rather than to PUSCH TPC, control channel overhead resulting from TPC may be minimized. For example, PUSCH TPC is preferably set to PUCCH TPC (e.g., $f_c^{(0)}(i)=g(i)$) for the specific SF set (e.g., SF set 0; static SFs).

Further, a plurality of PUSCH PC processes may be configured by a higher layer. A TPC command (e.g., $f_c^{(0)}(i)$) for the type-0 PUSCH PC process may be operatively connected to a TPC command (e.g., g(i) adjusted by the TPC field of DL-related DCI) for a specific PUCCH PC (e.g., $f_c^{(0)}(i)=g(i)$. Thereby, the PUCCH PC process and the PUSCH PC process may simultaneously perform CLPC accumulation. For a TPC parameter (e.g., $f_c^{(1)}(i)$) for the type-1 PUSCH PC process, the corresponding command may not be operatively connected to a TPC command for PUCCH PC, and CLPC accumulation may be performed through the TPC field of a specific UL-related DCI as in the conventional cases. For a TPC parameter (e.g., $f_c^{(2)}(i)$) for the type-2 PUSCH PC process, a specific tpc-Index and specific TPC-PUSCH-RNTI may be separately pre-configured through RRC signaling, and CLPC accumulation may be performed through DCI 3/3A. The plurality of PUSCH PC processes may include one or more PUSCH PC processes of the same type.

In addition, in each PUSCH PC process, at least one of parameters $\{P_{CMAX,c}(i), M_{PUSCH,c}(i), P_{O\_PUSCH,c}(j), \alpha_c(j), PL_c, \Delta_{TF,c}(i), f_c(i)\}$ may be separated and pre-configured through RRC signaling.

Embodiment 2

As a PUSCH power control method proposed in the present invention, PUSCH PC processes may be divided according to SF sets, and a TPC command for each PUSCH PC process is operated by the TPC field which is given when a UL grant is received in the corresponding SF set. Specifically, the TPC field may be applied only to TPC accumulation for a PUSCH transmitted in an SF belonging to an SF set in which a UL grant is received. In other words, a TPC command included in DCI format 0/4/3/3A may be applied only to SFs associated with an SF in which DCI format 0/4/3/3A has been received. Hereinafter, this method will be referred to as Rule A.

For example, if a UL grant accompanied by a TPC field is received in an SF belonging to a specific SF set (e.g., SF set 0; static SFs), the UE adjusts power by applying a corresponding TPC command only to CLPC accumulation of a PUSCH PC process associated with the specific SF set (e.g., SF set 0; static SFs), and performs PUSCH transmission for which transmit power is determined. If a UL grant accompanied by a TPC field is received in an SF of an SF set (e.g., SF set 1; flexible SFs) different from the specific SF set, the UE adjusts power by applying a corresponding TPC command only to CLPC accumulation of a PUSCH PC process associated with the SF set (e.g., SF set 1; flexible SFs), and performs PUSCH transmission with determined transmit power is.

For example, for a serving cell c, suppose that TPC of a PUSCH PC process applied only to SF set 1 is $f_c^{(1)}(i)$, and TPC of a PUSCH PC process applied only to SF set 2 is $f_c^{(2)}(i)$.

If TPC accumulation is enabled, $f_c^{(x)}(i)=f_c^{(x)}(i-1)+\delta_{PUSCH,c}(i-K_{PUSCH})$. Herein, if a UL grant corresponding to PUSCH transmission in SF #i or SF #j in which DCI format 3/3A is received belongs to SF set 1, x=1. If a UL grant corresponding to PUSCH transmission in SF #i or SF index j in which DCI format 3/3A is received belongs to SF set 2, x=2. In contrast with the conventional TPC accumulation, the UE may determine an SF set including SF #j in which a UL grant containing scheduling information about PUSCH transmission in SF #i is received (or DCI format 3/3A containing a TPC command applied to PUSCH transmission in SF #i is received), and then determine the value of x in $f_c^{(x)}(i)$ according to the determination. Thereby, the UE may determine a PUSCH PC process for which TPC accumulation should be performed among multiple PUSCH PC processes.)

If TPC accumulation is not enabled, $f_c^{(x)}(i)=\delta_{PUSCH,c}(i-K_{PUSCH})$. Herein, if a UL grant corresponding to PUSCH transmission in SF #i or SF #j in which DCI format 3/3A is received belongs to SF set 1, x=1. If a UL grant corresponding to PUSCH transmission in SF #i or SF #j in which DCI format 3/3A is received belongs to SF set 2, x=2. In contrast with the conventional TPC accumulation, the UE may determine which SF set includes SF #j in which the UL grant containing scheduling information about PUSCH transmission in SF #i is received (or DCI format 3/3A containing a TPC command applied to PUSCH transmission in SF #i is received), and then determine the value of x in $f_c^{(x)}(i)$ according to the determination. Thereby, the UE may determine a PUSCH PC process for which TPC accumulation should be performed among multiple PUSCH PC processes.

Embodiment 3

As another PUSCH power control method proposed in the present invention, PUSCH PC processes may be divided according to SF sets, and a TPC field contained in a UL grant (e.g., DCI format 0 or 4) received in SF #n may be used only for TPC accumulation of a PUSCH PC process associated with an SF set to which a PUSCH transmission SF (e.g., SF #n+k) scheduled by the UL grant belongs. Alternatively, a TPC field contained in DCI format 3/3A received in SF #n may be used only for TPC accumulation of a PUSCH PC process associated with an SF set including an SF (e.g., SF #n+k) in which PUSCH transmission subjected to the TPC field is performed. Specifically, depending on an SF set in which a PUSCH scheduled by the UL grant (or a PUSCH to which the TPC command of DCI format 3/3A is applied) is transmitted, the TPC field may be applied only to TPC accumulation for the PUSCH transmitted in an SF belonging to the SF set. In other words, a TPC command contained in DCI format 0/4/3/3A may be applied only to SFs associated with a PUSCH-transmission SF. Hereinafter, this method will be referred to as Rule B.

For example, if a UL grant for a PUSCH to be transmitted is received along with a TPC field (or DCI 3/3A containing a TPC field for the PUSCH is received) in an SF belonging to a specific SF set (e.g., SF set 0; static SFs), the UE adjusts power by applying a corresponding TPC command only to CLPC accumulation of a PUSCH PC process associated with the specific SF set (e.g., SF set 0; static SFs), and performs PUSCH transmission for which transmit power is determined. If a UL grant for a PUSCH to be transmitted is received along with a TPC field (or DCI 3/3A including a TPC field for the PUSCH is received) in an SF of an SF set (e.g., SF set 1; flexible SFs) different from the specific SF set, the UE adjusts power by applying a corresponding TPC command only to CLPC accumulation of a PUSCH PC process associated with the SF set (e.g., SF set 1; flexible SFs), and performs PUSCH transmission for which transmit power is correspondingly determined.

For example, for a serving cell c, suppose that TPC of a PUSCH PC process applied only to SF set 1 is $f_c^{(1)}(i)$, and TPC of a PUSCH PC process applied only to SF set 2 is $f_c^{(2)}(i)$.

If TPC accumulation is enabled, $f_c^{(x)}(i)=f_c^{(x)}(i-1)+\delta_{PUSCH,c}(i-K_{PUSCH})$. Herein, if SF #i in which a PUSCH is transmitted belongs to SF set 1, x=1. If SF #i in which a PUSCH is transmitted belongs to SF set 2, x=2. In contrast with the conventional TPC accumulation, the UE may determine an SF set including SF #i in which the PUSCH is transmitted, and then determine the value of x in $f_c^{(x)}(i)$ according to the determination. Thereby, the UE may determine a PUSCH PC process for which TPC accumulation should be performed among multiple PUSCH PC processes.

If TPC accumulation is not enabled, $f_c^{(x)}(i)=\delta_{PUSCH,c}(i-K_{PUSCH})$. Herein, if SF #i in which a PUSCH is transmitted belongs to SF set 1, x=1. If SF #i in which a PUSCH is transmitted belongs to SF set 2, x=2. In contrast with the conventional TPC accumulation, the UE may determine an SF set including SF #i in which the PUSCH is transmitted, and then determine the value of x in $f_c^{(x)}(i)$ according to the determination. Thereby, the UE may determine a PUSCH PC process for which TPC accumulation should be performed among multiple PUSCH PC processes.

Embodiment 4

In this embodiment, description will be given of a UL TPC method which is used when PUSCH transmission in multiple SFs is scheduled by one UL grant.

For example, if UL-DL configuration #0 (i.e., DSUUUD-SUUU) is established, and a UL index field is contained in UL-related DCI (e.g., DCI format 0/4) detected in SF #n and is set to 11, PUSCH transmission according to UL grant may be performed in both SF#n+k and SF#n+7. In this case, at least one of various rules (Rule 1 to Rule 8) described below may be applied to process the TPC field contained in the UL-related DCI detected in SF #n.

First, if the plurality of SFs belongs to the same SF set, and the SF set is associated with only one PUSCH PC process, one TPC command contained in the UL-related DCI may be applied to CLPC accumulation of the PUSCH PC process. The rules described below relate to applying one TPC command contained in the UL-related DCI to a PUSCH PC process when the SFs belong to different SF sets, and a separate PUSCH PC process is associated with each SF set.

According to Rule 1, CLPC accumulation according to the TPC is applied to all PUSCH PC processes associated with at least one SF of a plurality of SFs in which PUSCH is scheduled in order to adjust power for the PUSCH PC processes and perform PUSCH transmission based on the adjusted power. If the SFs belong to different SF sets, and a separate PUSCH PC process is associated with each SF set, one TPC command contained in the UL-related DCI may be applied to CLPC accumulation for the plurality of PUSCH PC processes simultaneously.

According to Rule 2, CLPC accumulation according to the TPC is applied only to a PUSCH PC process associated with one preceding (or leading) SF of a plurality of SFs in which PUSCH is scheduled in order to adjust power of the PUSCH PC process and perform PUSCH transmission based on the adjusted power. If the SFs belong to different SF sets, and a separate PUSCH PC process is associated with each SF set, the TPC command contained in the UL-related DCI is applied only to CLPC accumulation for the PUSCH PC process associated with an SF set to which the leading SF belongs, and is not applied to SF sets to which the other SFs belong.

According to Rule 3, CLPC accumulation according to the TPC is applied only to a PUSCH PC process associated with one SF having a lower (or lowest) slot index or subframe index than other SFs of a plurality of SFs in which PUSCH is scheduled in order to adjust power of the PUSCH PC process and perform PUSCH transmission based on the adjusted power. The slot/subframe index sequentially increases in a radio frame, and is then set back to index 0 at the boundary between radio frames. A lower slot/subframe index does not always mean that the index precedes other indexes in time. If the SFs belong to different SF sets and a separate PUSCH PC process is associated with each SF set, the TPC command contained in the UL-related DCI is applied only to CLPC accumulation for the PUSCH PC process associated with an SF set to which the SF having the lowest slot/subframe index belongs, and is not applied to SF sets to which the other SFs belong.

According to Rule 4, CLPC accumulation according to the TPC is applied only to a PUSCH PC process associated with one SF that comes later (or latest) in time sequence of a plurality of SFs in which PUSCH is scheduled in order to adjust power of the PUSCH PC process and perform PUSCH transmission based on the adjusted power. If the SFs belong to different SF sets, and a separate PUSCH PC process is associated with each SF set, the TPC command contained in the UL-related DCI is applied only to CLPC accumulation for the PUSCH PC process associated with an SF set to which the latest SF belongs, and is not applied to SF sets to which the other SFs belong.

According to Rule 5, CLPC accumulation according to the TPC is applied only to a PUSCH PC process associated with one SF having a higher (or highest) slot index or subframe index than other SFs of a plurality of SFs in which PUSCH is scheduled in order to adjust power of the PUSCH PC process and perform PUSCH transmission based on the adjusted power. If the SFs belong to different SF sets, and a separate PUSCH PC process is associated with each SF set, the TPC command contained in the UL-related DCI is applied only to CLPC accumulation for the PUSCH PC process associated with an SF set to which the SF having the highest slot/subframe index belongs, and is not applied to SF sets to which the other SFs belong.

Rule 6, which is an extension of Rule 2 to Rule 5, is applied to Q (Q>1) SFs.

According to Rule 2', which is a variant of Rule 2, CLPC accumulation according to the TPC is applied to PUSCH PC processes associated with Q SFs preceding the other SFs of a plurality of SFs in which PUSCH is scheduled. According to Rule 3', which is a variant of Rule 3, CLPC accumulation according to the TPC is applied to PUSCH PC processes associated with Q SFs having lower slot/subframe indexes than the other SFs of a plurality of SFs in which PUSCH is scheduled. According to Rule 4', which is a variant of Rule 4, CLPC accumulation according to the TPC is applied to PUSCH PC processes associated with Q SFs that come after the other SFs of a plurality of SFs in which PUSCH is scheduled. According to Rule 5', which is a variant of Rule 5, CLPC accumulation according to the TPC is applied to PUSCH PC processes associated with Q SFs having higher slot/subframe indexes than the other SFs of a plurality of SFs in which PUSCH is scheduled.

If the Q SFs belong to different SF sets, and a separate PUSCH PC process is associated with each SF set, the TPC command contained in the UL-related DCI is applied to CLPC accumulation for the PUSCH PC processes associated with SF sets to which Q SFs belong. If the Q SFs belong to the same SF set, and only one PUSCH PC process is associated with the SF set, one TPC command contained in the UL-related DCI may be applied to CLPC accumulation of the PUSCH PC process.

According to Rule 7, the TPC command is applied to CLPS accumulation for a PUSCH PC process associated with an SF set only if all SFs in which PUSCH is scheduled belong to the SF set. Otherwise (i.e., if not all the SFs in which PUSCH is scheduled are included in a specific SF set, but the SFs belong to different SF sets), the TPC command is ignored (i.e., the command is not applied to any PUSCH PC process).

According to Rule 8, if SFs in which PUSCH is scheduled belong to Q (Q>1) SF sets, the TPC command is applied to CLPC accumulation of PUSCH PC processes associated with the SF sets. Otherwise (i.e., if the SFs in which PUSCH is scheduled are included in different SF sets the number of which is greater than Q (Q>1)), the TPC command is ignored (i.e., the command is not applied to any PUSCH PC process). Herein, Q may be a threshold limiting the number of SF sets and be preset.

Rule 1 to Rule 8 described above are merely illustrative. One SF or Q SFs may be determined among a plurality of SFs in which PUSCH is scheduled, using various methods. For example, the one or Q SFs may be indicated by a relation to other configurations, a predetermined table, or explicit signaling.

For example, if UL-DL configuration #0 (i.e., DSUUUD-SUUU) is established for the UE, and the value of the UL index field contained in the UL-related DCI detected by the UE in SF #j is 11, operation of the UE may be defined based on SF #j as follows.

If the UL-related DCI is detected in SF#0, the value of TPC contained in the UL-related DCI is y, and the value of the UL index field is 11, PUSCH is scheduled in SF#4 and SF#7 by the UL grant contained in the UL-related DCI. Herein, it is assumed that SF#4 belongs to SF set 1, and SF#7 belongs to SF set 2. According to Table 8, $K_{PUSCH}=4$ for SF#4. Accordingly, the TPC value y provided in SF#0 (=SF#(4−$K_{PUSCH}$)) is applied to PUSCH transmission in SF#4. Referring to Table 8, $K_{PUSCH}=6$ for SF#7. Accordingly, if a TPC value is provided in SF#1 (=SF#(7−$K_{PUSCH}$)), this value may be applied to PUSCH transmission in SF#7. That is, the TPC value y provided in SF#0 may be applied only to $f_c^{(1)}(i)$ of SF set 1 associated with SF#4. This operation may conform to Rule B.

If the UL-related DCI is detected in SF#5, the value of TPC contained in the UL-related DCI is y, and the value of the UL index field is 11, PUSCH is scheduled in SF#9 and SF#2 by the UL grant contained in the UL-related DCI. Herein, it is assumed that SF#9 belongs to SF set 1, and SF#2 belongs to SF set 2. According to Table 8, $K_{PUSCH}=4$ for SF#9. Accordingly, the TPC value y provided in SF#5 is applied to PUSCH transmission in SF#4. Referring to Table 8, $K_{PUSCH}=6$ for SF#2. Accordingly, if a TPC value is provided in SF#6, this value may be applied to PUSCH transmission in SF#2. That is, the TPC value y provided in SF#5 may be applied only to $f_c^{(1)}(i)$ of SF set 1 associated with SF#9. This operation may conform to Rule B.

If the UL-related DCI is detected in SF#1, the value of TPC contained in the UL-related DCI is y, and the value of the UL index field is 11, PUSCH is scheduled in SF#7 and SF#8 by the UL grant contained in the UL-related DCI. Herein, it is assumed that SF#7 belongs to SF set 1, and SF#8 belongs to SF set 2. According to Table 8, $K_{PUSCH}=6$ for SF#7. Accordingly, the TPC value y provided in SF#1 is applied to PUSCH transmission in SF#7. Referring to Table 8, $K_{PUSCH}=7$ for SF#8. Accordingly, the TPC value y provided in SF#1 is also applied to PUSCH transmission in SF#8. That is, the TPC value y provided in SF#1 is also applied to $f_c^{(1)}(i)$ of SF set 1 associated with SF#7 and to $f_c^{(2)}(i)$ of SF set 2 associated with SF#8. This operation may conform to Rule 1.

If the UL-related DCI is detected in SF#6, the value of TPC contained in the UL-related DCI is y, and the value of the UL index field is 11, PUSCH is scheduled in SF#2 and SF#3 by the UL grant contained in the UL-related DCI. Herein, it is assumed that SF#2 belongs to SF set 1, and SF#3 belongs to SF set 2. According to Table 8, $K_{PUSCH}=6$ for SF#2. Accordingly, the TPC value y provided in SF#6 is applied to PUSCH transmission in SF#2. Referring to Table 8, $K_{PUSCH}=7$ for SF#3. Accordingly, the TPC value y provided in SF#6 is applied to PUSCH transmission in SF#3. That is, the TPC value y provided in SF#6 is also applied to $f_c^{(1)}(i)$ of SF set 1 associated with SF#2 and to $f_c^{(2)}(i)$ of SF set 2 associated with SF#3. This operation may conform to Rule 1.

Hereinafter, a description will be given of an additional example of the present invention.

If the UL-related DCI is detected in SF#1, the value of TPC contained in the UL-related DCI is y, and the value of the UL index field is 11, PUSCH is scheduled in SF#7 and SF#8 by the UL grant contained in the UL-related DCI. Herein, it is assumed that both SF#7 and SF#8 belong to the same SF set (e.g., SF set 1). In this case, the TPC value y provided in SF#1 may be applied not only to PUSCH transmission in SF#7 but also to PUSCH transmission in SF#8. That is, if the previous TPC level is 0, PUSCH transmission is performed with transmit power of level y in SF#7 and with transmit power of level 2y in SF#8.

Herein, if only one TPC command is provided for PUSCH transmission in SFs belonging to the same SF set, it may be more appropriate in terms of accurately meeting the purpose of the TPC command to maintain PUSCH transmit power in the corresponding PUSCH PC process until a new TPC command (or an additional TPC command) is provided. That is, in the example given above, if PUSCH is scheduled in SF#7 and SF#8 by the UL-related DCI detected in SF#1, SF#7 and SF#8 included in the same SF set (or subjected to the same PUSCH PC process), and one TPC command contained in the UL-related DCI indicates the value y, PUSCH transmission is performed with transmit power of level y in SF#7. Preferably, PUSCH transmission is also performed with transmit power of level y in SF#8 (namely, the TPC command may not be applied to SF#8).

That is, if the TPC command contained in the UL-related DCI detected in an SF is applied to PUSCH transmission in a plurality of SFs in which PUSCH is scheduled by the UL grant contained in the UL-related DCI, and the plurality of SFs belongs to the same SF set, the TPC command is applied to only one SF (e.g., an SF that comes first or last in time) of the SFs, and is not applied to the other SFs. Additionally, a rule stating that SFs are consecutive may be applied. This rule may be defined as Rule 2", i.e., another variant of Rule 2.

As in the examples described above, the TPC operation that the UE should apply in a plurality of PUSCH transmission subframes scheduled by the UL grant of UL-related DCI may be differently defined depending on a subframe in which the UL-related DCI is received along with the UL index set to 11 (for example, Rule B, Rule 1, Rule 2 or Rule 2" is applied depending on a subframe index in which the UL-related DCI is detected along with the UL index set to 11). Application of Rule B, Rule 1, Rule 2, and Rule 2 " in the examples given above is simply illustrative. At least one of the various proposed rules (Rules A, B, 1, 2, 3, 4, 5, 6, 7, and 8) may be differently applied depending on conditions defined based on the index of a subframe in which the UL-related DCI is detected/received along with the UL index set to 11.

Embodiment 5

In this embodiment, description will be given of UL operation that is performed when a TPC command provided by DCI format 0/4 and a TPC command provided by DCI format 3/3A are detected in the same subframe.

The legacy LTE/LTE-A system defines that the UE uses $\delta\delta_{PUSCH,c}$ provided from DCI format 0/4 if both DCI format 0/4 and DCI format 3/3A for the serving cell c are detected in the same subframe. That is, UE operation is defined such that, if the UL-related DCI (i.e., DCI format 0/4) and DCI format 3/3A are received/detected together in a specific subframe with index j, the TPC command for PUSCH applies only a specific TPC value (e.g., y value) indicated by the UL-related DCI, and a specific TPC value (e.g., z value) indicated through DCI format 3/3A is ignored in the subframe with index j.

In the present invention, on the other hand, for a UE meeting a predetermined condition, if a TPC value (e.g., y value) of UL-related DCI (i.e., DCI format 0/4) and a TPC value (e.g., z value) of DCI format 3/3A are received/detected together in the specific subframe with index j, both the TPC values y and z may be defined or set to be effectively applied.

Specifically, TPC (particularly, TPC for PUSCH) may apply the TPC value y contained in DCI format 0/4 detected in subframe j to $f_c^{(x)}(i)$ in PUSCH transmission subframe i determined according to a rule such as Table 8 (wherein x is determined depending on whether the subframe with index i in which PUSCH is transmitted belongs to SF set 0 or SF set 1) and also effectively apply the TPC value z contained in DCI format 3/3A detected in the subframe j to PUSCH transmission subframe k determined according to a rule such as Table 8.

The UE may perform the aforementioned operation when the UE meets the predetermined condition, which may be defined as including at least one of the following conditions: an enhanced IMTA (eIMTA) function is activated or enabled; UL-DL configuration #0 is established; the UL index field is set to a specific value; or the operation is indicated/configured through predetermined signaling (including implicit signaling or explicit signaling). Herein, activating/enabling the eIMTA function may be performed through RRC signaling which indicates that the eIMTA function (e.g., configuration of a maximum of two power control SF sets including the values of $P_{O\_PUSCH}$ and/or α, dynamic signaling for indicating actual UL-DL config, DL (or UL) HARQ reference configuration, etc.) is enabled or disabled. If disabling is signaled, at least one of elements of the eIMTA function may be released. If enabling is signaled, at least one of elements of the eIMTA function may be configured or activated. Establishing UL-DL configuration #0 includes establishment through the system information (i.e., SIB1) or establishment by dynamic signaling that overrides the configuration. Setting the UL index field to a specific value may be defined as setting the UL index to 01 or 10.

As a specific example, suppose that, when UL-DL configuration #0 (i.e., DSUUUDSUUU) is given, the TPC value of UL-related DCI having the UL index field set to 01 (or the LSB of the UL index field is set to 1) is y, the TPC value of DCI format 3/3A is z, and the UL-related DCI and DCI format 3/3A are simultaneously received in SF#0. In this case, PUSCH scheduling occurs only in SF#7, and $K_{PUSCH}=7$ is applied according to the rule described above prior to Table 8. Accordingly, the TPC value y provided in SF#0 (i.e., SF#($7-K_{PUSCH}$)) is applied in SF#7. Additionally, the TPC value z of DCI format 3/3A detected in SF#0, which is not applied to PUSCH scheduling is applied to SF#4.

In addition, for UL-DL configuration #0 (i.e., DSUUUDSUUU), suppose that the TPC value of UL-related DCI having the UL index field set to 01 (or the LSB of the UL index field is set to 1) is y, the TPC value of DCI format 3/3A is z, and the UL-related DCI and DCI format 3/3A are simultaneously received in SF#5. In this case, PUSCH scheduling occurs only in SF#2, and $K_{PUSCH}=7$ is applied according to the rule described above prior to Table 8. Accordingly, the TPC value y provided in SF#5 (i.e., SF#($2-K_{PUSCH}$)) is applied in SF#2. The TPC value z of DCI format 3/3A detected in SF#5 is applied to SF#9.

When UL-related DCI and DCI format 3/3A are simultaneously detected in SF#0, suppose that SF#4 belongs to SF set 1 and SF#7 belongs to SF set 2. According to a conventionally defined operation, only TPC value y is applied to SF#7 to determine and apply $f_c^{(2)}(i)$. On the other hand, no change occurs in $f_c^{(1)}(i)$. According to an example of the present invention, only TPC value y is applied to SF#7 to determine and apply $f_c^{(2)}(i)$ and the TPC value z is applied to SF#4 to determine and apply $f_c^{(1)}(i)$. As can be seen from this example, PUSCH scheduling is not applied to SF#4, but $f_c^{(1)}(i)$ belonging to SF set 1 may be adjusted through DCI format 3/3A separately from (or regardless of) PUSCH scheduling anytime (before or after PUSCH scheduling). Thereby, flexibility of network configuration/indication may be provided. Further, for an eIMTA supporting system to which the present invention is applicable, power control is applied by dividing SFs into SF set 0, 1, 2, . . . in the time domain, and thus flexibility allowing DCI signaling for providing an independent TPC command to each SF set is lowered. According to the proposed method, however, DCI format 3/3A may be applied to each SF set without being restricted by time (particularly, regardless of whether DCI format 3/3A and the UL-related DCI are provided at the same time), and thus the aforementioned problem may be solved.

Embodiment 6

In this embodiment, additional description will be given of an operation that is performed depending on whether actual use of SF#i (e.g., DL or UL subframe) considered when a TPC command contained in DCI format 0/4 is provided in SF#(i-k) associated with SF#i according to a TPC timeline.

If a subframe in which the UL grant of DCI format 0/4 performs scheduling is determined to be a DL subframe according to the actual UL-DL config, this means that one resource configured for DL use is used for UL transmission, and therefore a problem may occur. In this case, the UL grant, reconfiguration DCI for providing the actual UL-DL config, or both, may be ignored, in consideration of (conflicting) PDCCH.

Specifically, when one UL grant schedules one PUSCH, the UL grant may be ignored if use of PUSCH transmission UL subframe is reset to DL use. Additionally or separately, when one UL grant schedules two PUSCHs, the UL grant may be ignored if at least one of UL subframes in which the two PUSCHs are transmitted is reconfigured for DL use (or both PUSCHs are reconfigured for DL use).

An indication indicating whether each of UE operations according to the examples described above is enabled/disabled may be provided through RRC signaling or MAC signaling.

Figure 13:
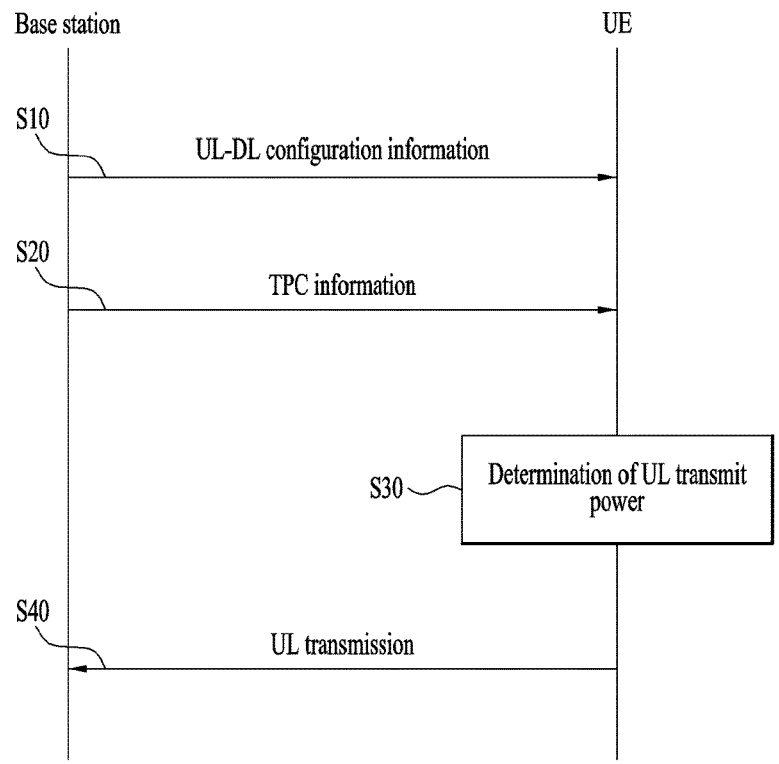
FIG. 13 is a flowchart illustrating a method for controlling UL transmit power according to an embodiment of the present invention.

FIG. 13 is a flowchart illustrating a method for controlling UL transmit power according to an embodiment of the present invention.

In step S10, a UE may receive information about a UL-DL configuration from a base station. This information may be provided through system information (SIB) or as dynamic configuration for overriding the SIB, or may be configuration information for other uses (e.g., defining a UL or DL HARQ timeline).

In step S20, the UE may receive TPC information from the base station. This information may be provided through UL-related DCI of DCI format 0/4 or through DCI format 3/3A or another DCI format.

In step S30, the UE may determine or update TPC for UL transmission (e.g., PUCCH transmission or PUSCH transmission) based on the information received in steps S10 and S20.

In step S40, the UE may perform UL signal transmission to the base station according to the TPC value determined in step S30.

For the method illustrated in FIG. 13, the above-described embodiments may be independently applied or two or more thereof may be simultaneously applied, and description of redundant parts is omitted.

While FIG. 13 illustrates operations for the exemplary method in series for simplicity, this is not intended to limit the order in which the operations are performed. Operations may be performed simultaneously or in a different order if necessary. Further, not all steps illustrated in FIG. 13 are needed to implement the proposed method of the present invention.

Figure 14:
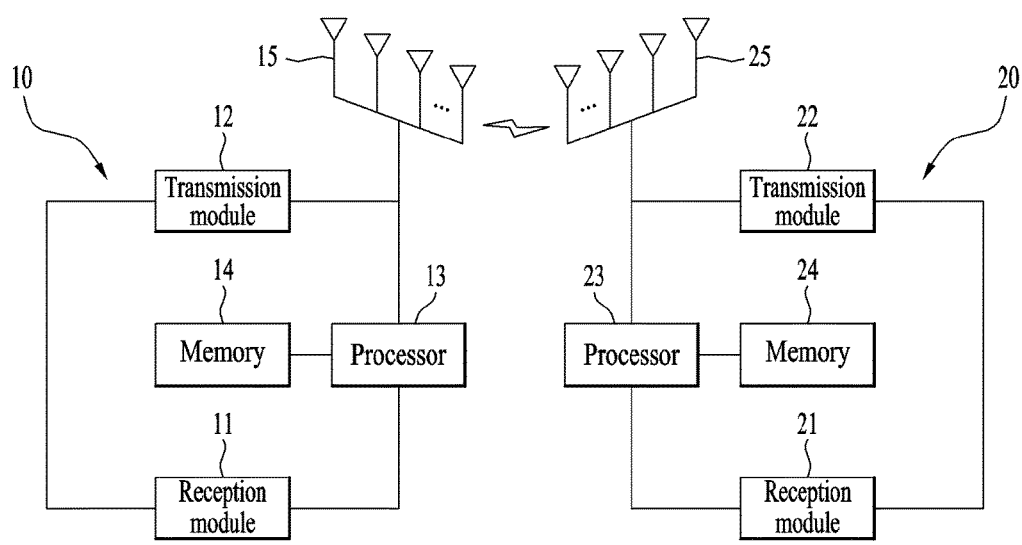
FIG. 14 is a diagram illustrating a preferred embodiment of a base station 10 and a user equipment according to the present invention.

FIG. 14 is a diagram illustrating a preferred embodiment of a base station 10 and a user equipment 20 according to the present invention.

Referring to FIG. 14, the base station 10 of the present invention may include reception module 11, a transmission module 12, a processor 13, a memory 14, and a plurality of antennas 15. The plurality of antennas 15 mean the base station that supports MIMO transmission and reception. The reception module 11 may receive various kinds of signals, data and information on an uplink from the user equipment. The transmission module 12 may transmit various kinds of signal, data and information on a downlink to the user equipment. The processor 13 may control the overall operation of the base station 10.

The processor 13 of the base station 10 is configured to determine information about UL-DL configuration, TPC information, and the like and provide the same to a user equipment 20 by controlling the transmission module 12. The processor 13 may also be configured to receive UL transmission from the user equipment 20 by controlling the reception module 11.

For various kinds of information and UL transmit power control methods that the base station 10 configured as above provides to the user equipment 20 to allow the user equipment 20 to control UL transmit power, one of or a combination of two or more of the examples proposed in the present invention may be applied.

In addition, the processor 13 of the base station 10 performs an operation for information received by the base station 10, information to be transmitted to the outside, etc., and the memory 14 may store the operation processed information for a predetermined time and may be replaced with an element such as a buffer (not shown).

Referring to FIG. 14, the user equipment 20 of the present invention may include reception module 21, a transmission module 22, a processor 23, a memory 24, and a plurality of antennas 25. The plurality of antennas 25 means the user equipment that supports MIMO transmission and reception. The reception module 21 may receive various kinds of signals, data and information on a downlink from the base station. The transmission module 22 may transmit various kinds of signal, data and information on an uplink to the base station. The processor 23 may control the overall operation of the user equipment 20.

The processor 23 of the user equipment 20 may be configured to receive information about UL-DL configuration, TPC information, and the like from the base station 10 by controlling the reception module 21. The processor 23 may also be configured to transmit UL transmission to the base station 10 by controlling the transmission module 22.

For various kinds of information and UL transmit power control methods that the user equipment 20 configured as above receives from the base station 10 to control UL transmit power, one of or a combination of two or more of the examples proposed in the present invention may be applied.

In addition, the processor 23 of the user equipment 20 performs an operation for information received by the user equipment 20, information to be transmitted to the outside, etc., and the memory 24 may store the operation processed information for a predetermined time and may be replaced with an element such as a buffer (not shown).

The details of the aforementioned base station and the aforementioned user equipment may be configured in such a manner that the aforementioned various embodiments of the present invention may independently be applied to the aforementioned base station and the aforementioned user equipment, or two or more embodiments may simultaneously be applied to the aforementioned base station and the aforementioned user equipment, and repeated description will be omitted for clarification.

In description of various examples of the present invention given above, the base station has been mainly assumed to be a DL transmission entity or a UL reception entity, and the UE has been mainly assumed to be a DL reception entity or a UL transmission entity. However, the scope of the present invention is not limited thereto. For example, the description of the base station may also be applied to a case where a cell, antenna port, antenna port group, RRH, transmission point, reception point, access point, or relay serves as an entity of DL transmission to the UE or an entity of UL reception from the UE. When the relay serves as an entity of DL transmission to the UE or an entity of UL reception from the UE or serves as an entity of UL transmission to the base station or an entity of DL reception from the base station, the principle of the present invention described above in various embodiments may be equally applied.

The embodiments according to the present invention may be implemented by various means, for example, hardware, firmware, software, or their combination.

If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention may be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is also obvious to those skilled in the art that claims that are not explicitly cited in each other in the appended claims may be presented in combination as an embodiment of the present invention or included as a new claim by a subsequent amendment after the application is filed.

The embodiments of the present invention described above are applicable to various mobile communication systems.

What is claimed is:

1. A method for performing uplink (UL) power control by a user equipment in a wireless communication system, the method comprising:
    receiving downlink (DL) hybrid automatic repeat and request (HARQ) configuration information on a UL-DL configuration used as a DL HARQ reference configuration;
    receiving downlink control information (DCI) containing transmit power control (TPC) information;
    determining transmit power of a physical uplink control channel (PUCCH) carrying acknowledgement (ACK)/negative acknowledgement (NACK) information for a physical downlink shared channel (PDSCH) based on the TPC information; and
    transmitting the PUCCH with the transmit power of the PUCCH,
    wherein the transmit power of the PUCCH is determined based on the TPC information and the DL HARQ reference configuration, and
    wherein the DL HARQ configuration information indicates one of only UL-DL configurations 2, 4 and 5 as the DL HARQ reference configuration, among seven UL-DL configurations available in the wireless communication system, and
    wherein the seven UL-DL configurations are listed in the following table:

| UL-DL configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D, | where D denotes a downlink subframe, S denotes a special subframe and U denotes a uplink subframe.

2. The method according to claim 1, further comprising:
    receiving time division duplex (TDD) configuration information on a TDD UL-DL configuration.

3. The method according to claim 2, wherein the TDD configuration information is received in system information.

4. The method according to claim 2, wherein the TDD configuration information indicates one of the seven UL-DL configurations as the TDD UL-DL configuration.

5. The method according to claim 1, wherein the transmit power of the PUCCH transmitted in a subframe i is determined based on g(i),
wherein $$g(i) = g(i-1) + \sum_{m=0}^{M-1} \delta_{PUCCH}(i - k_m),$$

wherein 'i' a subframe number,
wherein g(i) denotes a current PUCCH power control adjustment state of the subframe i, based on a downlink association set K: $\{k_0, k_1, \ldots, k_{M-1}\}$, where $k_m \in K$,
wherein M and $k_m$ are given in the following table based on the DL HARQ reference configuration:

| UL-DL Configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | —, | and
wherein $\delta_{PUCCH}$ is a value determined based on the TPC information contained in the DCI.

6. A user equipment for transmitting transmit uplink (UL) signals, the user equipment comprising:
   a transmitter;
   a receiver; and
   a processor configured to:
      control the receiver to receive downlink (DL) hybrid automatic repeat and request (HARQ) configuration information on a UL-DL configuration used as a DL HARQ reference configuration;
      control the receiver to receive downlink control information (DCI) containing transmit power control (TPC) information;
      determine transmit power of a physical uplink control channel (PUCCH) carrying acknowledgement (ACK)/negative acknowledgement (NACK) information for a physical downlink shared channel (PDSCH) based on the TPC information; and
      control the transmitter to transmit the PUCCH with the transmit power of the PUCCH,
   wherein the transmit power of the PUCCH is determined based on the TPC information and the DL HARQ reference configuration,
   wherein the DL HARQ configuration information indicates one of only UL-DL configurations 2, 4 and 5 as the DL HARQ reference configuration, among seven UL-DL configurations available in the wireless communication system, and
   wherein the seven UL-DL configurations are listed in the following table:

| UL-DL configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D, | where D denotes a downlink subframe, S denotes a special subframe and U denotes a uplink subframe.

7. The user equipment according to claim 6, wherein the processor is further configured to control the receiver to receive time division duplex (TDD) configuration information indicating a TDD UL-DL configuration.

8. The user equipment according to claim 7, wherein the TDD configuration information is received in system information.

9. The user equipment according to claim 7, wherein the TDD configuration information indicates one of the seven UL-DL configurations as the TDD UL-DL configuration.

10. The user equipment according to claim 6, wherein the transmit power of the PUCCH transmitted in a subframe i is determined based on g(i),
   wherein $$g(i) = g(i-1) + \sum_{m=0}^{M-1} \delta_{PUCCH}(i - k_m),$$

wherein 'i' is a subframe number,
   wherein g(i) denotes a current PUCCH power control adjustment state of the subframe i, based on a downlink association set K: $\{k_0, k_1, \ldots, k_{M-1}\}$, where $k_{m \in K}$,
   wherein M and $k_m$ are given in the following table based on the DL HARQ reference configuration:

| UL-DL Configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | —, | and
   wherein $\delta_{PUCCH}$ is a value determined based on the TPC information contained in the DCI.

* * * * *